United States Patent
Ikeda et al.

(10) Patent No.: US 7,802,456 B2
(45) Date of Patent: Sep. 28, 2010

(54) WORK BENDING ANGLE DETECTING DEVICE AND WORK BENDING MACHINE

(75) Inventors: Hidekatsu Ikeda, Kanagawa (JP); Ken Hatano, Kanagawa (JP)

(73) Assignee: Amada Company, Limited, Kanagawa (JP)

( * ) Notice: Subject to any disclaimer, the term of this patent is extended or adjusted under 35 U.S.C. 154(b) by 560 days.

(21) Appl. No.: 11/722,839

(22) PCT Filed: Dec. 27, 2005

(86) PCT No.: PCT/JP2005/023937

§ 371 (c)(1),
(2), (4) Date: Sep. 7, 2007

(87) PCT Pub. No.: WO2006/070822

PCT Pub. Date: Jul. 6, 2006

(65) Prior Publication Data

US 2009/0120156 A1    May 14, 2009

(30) Foreign Application Priority Data

Dec. 27, 2004  (JP) .......................... 2004-377571
Dec. 9, 2005   (JP) .......................... 2005-356558

(51) Int. Cl.
*B21D 5/02* (2006.01)

(52) U.S. Cl. .......... 72/31.05; 72/16.2; 72/17.3; 72/31.01; 72/31.1; 72/389.3; 72/389.6; 72/702

(58) Field of Classification Search ........ 72/17.1, 72/19.1, 19.8, 21.1, 31.1, 31.11, 389.1, 389.3, 72/389.6, 702, 16.1, 16.2, 16.4, 17.3, 31.01, 72/31.05

See application file for complete search history.

(56) References Cited

U.S. PATENT DOCUMENTS

| | | | |
|---|---|---|---|
| 4,489,586 A * | 12/1984 | Hess | 72/389.3 |
| 4,564,765 A | 1/1986 | Blaich | |
| 4,864,509 A * | 9/1989 | Somerville et al. | 700/165 |
| 5,060,495 A | 10/1991 | Naoomi et al. | |
| 5,062,283 A * | 11/1991 | Miyagawa et al. | 72/389.3 |
| 5,285,668 A * | 2/1994 | Tokai | 72/17.3 |
| 5,375,340 A * | 12/1994 | Gerritsen | 72/17.3 |
| 5,584,199 A | 12/1996 | Sartorio | |
| 5,603,236 A * | 2/1997 | Hongo | 72/389.1 |

(Continued)

FOREIGN PATENT DOCUMENTS

DE     29623800     11/1999

(Continued)

OTHER PUBLICATIONS

English Language Abstract of JP 64-2723, Jan. 6, 1989.

(Continued)

*Primary Examiner*—David B Jones
(74) *Attorney, Agent, or Firm*—Greenblum & Bernstein, P.L.C.

(57) ABSTRACT

A bending angle detecting device for a workpiece used in a bending machine that bends the workpiece in cooperation of upper and lower tools. The bending angle detecting device has a detector which includes a casing and which can detect a bending angle of the workpiece with the casing fixed in contact with a contact portion of the lower tool.

6 Claims, 28 Drawing Sheets

U.S. PATENT DOCUMENTS

| | | | | |
|---|---|---|---|---|
| 5,829,288 | A | * | 11/1998 | Serruys ................... 72/17.1 |
| 5,842,366 | A | * | 12/1998 | Klingel et al. .............. 72/31.1 |
| 6,098,435 | A | | 8/2000 | Takada |
| 6,240,646 | B1 | * | 6/2001 | Ronnmark et al. .......... 33/1 PT |
| 6,571,589 | B1 | * | 6/2003 | Ito et al. ................... 72/389.6 |
| 6,651,472 | B2 | * | 11/2003 | Chebbi ...................... 72/31.1 |
| 6,708,541 | B1 | * | 3/2004 | Matsumoto et al. ........ 72/389.3 |
| 6,959,573 | B2 | * | 11/2005 | Matsumoto et al. ........ 72/31.11 |
| 7,007,530 | B2 | | 3/2006 | Koyama et al. |
| 7,392,678 | B2 | * | 7/2008 | Niwa et al. ................ 72/31.01 |
| 2006/0162408 | A1 | | 7/2006 | Niwa et al. |

FOREIGN PATENT DOCUMENTS

| | | |
|---|---|---|
| EP | 0352097 | 1/1990 |
| EP | 1563921 | 8/2005 |
| FR | 2526158 | 11/1983 |
| JP | 64 2723 | 1/1989 |
| JP | 1-199104 | 8/1989 |
| JP | 5 337554 | 12/1993 |
| JP | 2001 121215 | 5/2001 |
| JP | 2005 319515 | 11/2005 |
| WO | 94/19662 | 9/1994 |
| WO | 95/05905 | 3/1995 |
| WO | 97 30803 | 8/1997 |
| WO | 00/00308 | 1/2000 |
| WO | 00/09275 | 2/2000 |
| WO | 2004 037457 | 5/2004 |

OTHER PUBLICATIONS

English Language Abstract of JP 2001-121215, May 8, 2001.
English Language Abstract of JP 2005-319515, Nov. 17, 2005.
English Language Abstract of JP 5337554, Dec. 21, 1993.
U.S. Appl. No. 11/576,735 to Ikeda, filed Apr. 5, 2007.

* cited by examiner (A)

(B)

$$\theta = \frac{\theta_1 + \theta_2}{2}$$

$\delta 1 = \delta 2$
$\alpha 1 = \alpha 2$

FIG. 27

| BENDING SEQUENCE | TOOL | TOOL POSITION $l_0$ | BI1 POSITION $l_1$ | BI2 POSITION $l_2$ | BI3 POSITION $l_3$ | FINAL DV VALUE | L VALUE | NAVIGATION MEMBER POSITION $l_N$ |
|---|---|---|---|---|---|---|---|---|
| 1 | a | 700mm | 850mm | 700mm | 650mm | 100mm | 200mm | 900mm |
| 2 | b | 250mm | ⋯ | ⋯ | ⋯ | ⋯ | ⋯ | ⋯ |
| 3 | c | −300mm | ⋯ | ⋯ | ⋯ | ⋯ | ⋯ | ⋯ |
| 4 | d | −650mm | ⋯ | ⋯ | ⋯ | ⋯ | ⋯ | ⋯ |
| ⋯ | ⋯ | ⋯ | ⋯ | ⋯ | ⋯ | ⋯ | ⋯ | ⋯ |

(A)

X-AXIS DIRECTION

(B)

X-AXIS DIRECTION

US 7,802,456 B2

WORK BENDING ANGLE DETECTING DEVICE AND WORK BENDING MACHINE

TECHNICAL FIELD

The present invention relates to a workpiece bending angle detecting device and the like, and particularly relates to a workpiece bending angle detecting device which measures workpiece bending angle by using a side face of a tool, and a workpiece bending machine.

BACKGROUND ART

There has been known a workpiece bending machine which measures a bending angle of a workpiece bent in cooperation of a punch and a die in the following manner. A cylinder is moved upward from a detector provided on each side of the die in a width direction, so as to bring a predetermined position thereof into contact with a straight part of the workpiece. Simultaneously, a contact, which is provided for the cylinder and biased upward so as to move up and down, is brought into contact with the straight part of the workpiece. A height position of the contact at this time is measured by a length measuring device, and the working piece bending angle is detected from a difference in height and a horizontal distance between the predetermined position and the contact point of the contact. One of the prior technologies relating to the present invention is Japanese Patent Application Laid-open Publication No. 2001-121215 (Patent Literature 1).

In the aforementioned conventional workpiece bending machine, on each side of the die in the width direction on the upper surface of a die holding member (die holder) through which the die is attached to an upper end of a lower table, a guide rail is provided along the longitudinal direction of the die; a slider is provided on the guide rail so as to move in the longitudinal direction of the die; and the detector is provided on the slider. Accordingly, for example, if the guide rail has bad straightness, the detector may move in a rolling manner (for example, the detector moves in a rolling manner, so as to slightly rotate around an axis extending in the direction that the detector moves), thereby sometimes preventing accurate measurement of the workpiece bending angle.

The present invention was made in the light of the aforementioned problem, and an object of the present invention is to provide a workpiece angle detecting device in a bending machine which can measure a workpiece bending angle with high accuracy, the bending machine bending a workpiece in cooperation of upper and lower tools. Another object of the present invention is to provide a workpiece bending angle detecting system and workpiece bending machine including the workpiece angle detecting device.

DISCLOSURE OF THE INVENTION

To achieve the aforementioned first object, a first aspect of the present invention is a workpiece bending angle detecting device used in a bending machine which bends a workpiece in cooperation of upper and lower tools, the device including: a casing; and a detector capable of detecting a bending angle of the workpiece with the casing fixed in contact with a contact portion of one of the upper and lower tools.

A second aspect of the present invention according to the first aspect is the workpiece bending angle detecting device, further including: a first moving unit which is capable of moving the detector between a position of the detector when the casing of the detector is fixed in contact with the contact portion and a position of the detector when the detector is the farthest from the tools; and a second moving unit which is capable of moving the detector in a direction of a bending line of the workpiece when the detector is separated from the tools by the first moving unit.

A third aspect of the present invention according to the first or second aspect is the workpiece bending angle detecting device in which the contact portion is formed in a side face of the lower tool; and the first moving unit is a unit to diagonally move the detector from a lower retracted position where the detector is the farthest from the lower tool to an upper contact position where the casing of the detector is fixed in contact with the contact portion and the first moving unit is the unit also to linearly moves the detector on a side near the lower retracted position and moves the detector on a side near the upper contact position so that a rate at which the detector horizontally approaches the contact portion is higher than a rate at which the detector rises.

A fourth aspect of the present invention is a workpiece bending machine, including: a bending sequence determination unit determining a bending sequence of a workpiece on the basis of product information; a tool determination unit determining tools used for bending of the workpiece on the basis of the product information; a tool layout determination unit determining a layout of the tools used for bending of the workpiece on the basis of the product information; a workpiece position calculation unit calculating, as workpiece position information, a position of the workpiece with respect to setting positions of the tools determined by the tool layout determination unit for each step of the bending sequence of the workpiece determined by the bending sequence determination unit; and an angle detection position determination unit determining a position where the bending angle of the workpiece is detected for each step of the bending sequence of the workpiece determined by the bending sequence determination unit.

A fifth aspect of the present invention according to the fourth embodiment is the workpiece bending machine further including: a navigating unit guiding the position of the workpiece in a direction in which the bending line of the workpiece extends for bending of the workpiece.

A sixth aspect of the present invention according to the fourth or fifth aspect is the workpiece bending machine, further including: a plurality of workpiece bending angle detecting devices which detect the bending angle of the workpiece, in which the workpiece bending angle detecting devices are allowed to be independently moved and positioned; and the angle detecting position determination unit determines a number and positions of the workpiece bending angle detecting devices used on the basis of the product information.

A seventh aspect of the present invention according to any one of the fourth to sixth aspects is the workpiece bending machine, further including: a footswitch to activate a ram of the workpiece bending machine, in which the footswitch is moved and positioned on the basis of the position of the workpiece calculated by the workpiece position calculation unit.

An eighth aspect of the present invention according to any one of the fourth to seventh aspects is the workpiece bending machine, in which each of the workpiece bending angle detecting devices detecting the bending angle of the workpiece is the workpiece bending angle detecting device according to any one of the first to third aspects.

A ninth aspect of the present invention according to any one of the fourth to eighth aspects is the workpiece bending machine, in which a plurality of crowning units are provided for at least one of an upper table on which an upper tool is set and a lower table on which a lower tool is set.

According to the inventions cited in the first to third aspects of the present invention, it is possible to have an effect on measuring the bending angle of the workpiece with high accuracy.

According to the inventions cited in the fourth to ninth aspects of the present invention, it is possible to have an effect on providing a workpiece bending machine which can efficiently produces products.

BRIEF DESCRIPTION OF DRAWINGS

FIG. 27 is a view showing a screen displayed on a display unit of the controller.

BEST MODES FOR CARRYING OUT THE INVENTION

A description is given of best embodiments of the present invention below with reference to the drawings.

First Embodiment

First, a schematic description is given of an entire constitution of a workpiece bending machine (press brake) 101 for facilitating the understanding.

Figure 1:
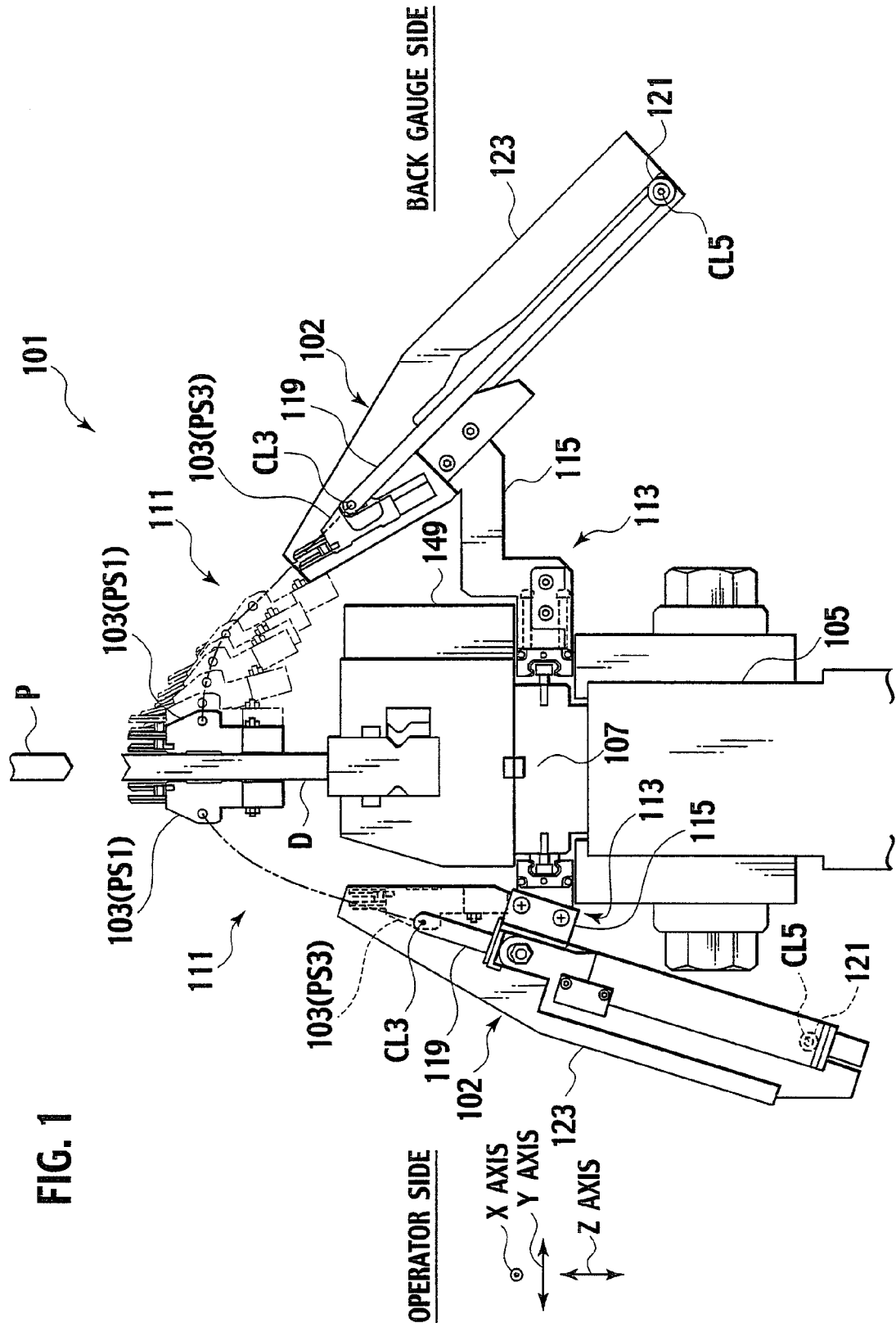
FIG. 1 is a view of a part of a workpiece bending machine including a lower tool and workpiece bending angle detecting devices, viewed in the longitudinal direction of the lower tool.

FIG. 1 is a view of a part of the workpiece bending machine 101 including a lower tool D and workpiece bending angle detecting devices (hereinafter, sometimes just referred to as a bending angle detecting device) 2, viewed in a longitudinal direction of the lower tool D.

Figure 22:
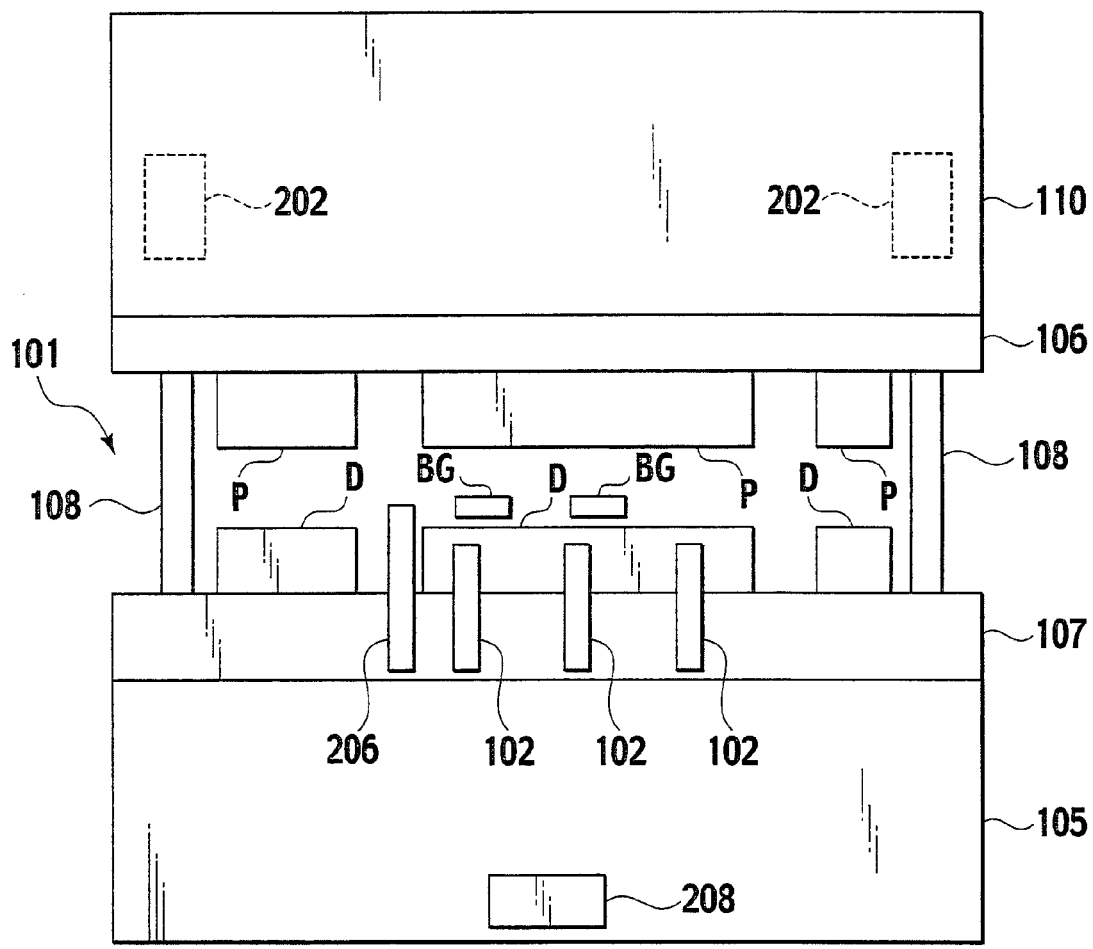
FIG. 22 is a front view showing a schematic structure of a workpiece bending machine.

The workpiece bending machine (hereinafter, sometimes just referred to as a bending machine) 101 includes, as shown in FIG. 22, an upper table (ram) 110 in upper part of a side frame and a lower table 105 in lower part of the side frame. On the bottom of the upper table 110, upper tools (punches) P are attached with a punch holder 106 interposed therebetween. On the top of the lower table 105, lower tools (dies) D are attached with a die holder 107 interposed therebetween.

A thin plate-shaped workpiece W is bent in cooperation of the upper and lower tools P and D. Specifically, for example, the thin plate-shaped workpiece W is bent by, under the control of a controller (a controller controlling the whole of the workpiece bending machine 101) 201 shown in FIG. 26, moving the upper table 110 relative to a side frame 108 using an actuator 202 composed of a hydraulic cylinder, a servo motor, and the like and moving the upper tools P relative to the lower tool D to bring the upper and lower tools P and D close to each other.

In the bending machine 101, the upper tools P are positioned above while the lower tools D are positioned below, and a bending line of the workpiece W extends horizontally.

The bending machine 101 bends the workpiece W by moving only the upper tools P with the lower tools D fixed. However, the work piece W may be bent by only moving the lower tools D with the upper tools P fixed or by moving both of the upper and lower tools P and D. In other words, bending of the workpiece W only requires bringing close to each other the upper and lower tools P and D which are apart from each other.

Furthermore, the upper and lower tools P and D may be arranged for bending so that the bending line of the workpiece W extends in a vertical direction or another direction (for example, diagonally).

Moreover, in the bending machine 101, bending of the workpiece W is performed with the workpiece W held by an operator.

Herein, for convenience of explanation, a horizontal direction that the bending line of the workpiece W extends in bending of the workpiece W with the bending machine 101 is sometimes referred to as an x-axis direction. The x-axis direction is the same as the longitudinal direction of the tools P and D and is also referred to as a right-left direction of the bending machine 101.

Moreover, another horizontal direction which is orthogonal to the x-axis direction is sometimes referred to as a y-axis direction. The y-axis direction is the same as the width direction of the tools P and D and is also referred to as a front-rear direction of the bending machine 101.

Furthermore, the vertical direction is sometimes referred to as a z-axis direction.

Each of the bending angle detecting devices 102 used in the workpiece bending machine 101 includes a detector 103.

The detector 103 includes a casing 109. The detector 103 detects the bending angle of the workpiece W with the casing 109 fixed in contact with contact portions (contact portions formed in predetermined positions) of each lower tool D which are in the vicinity of portions of the tools P and D that perform bending.

The detector 103 is fixed in contact with the lower tool D at least two contact portions apart from each other in the direction of the bending line of the workpiece W or fixed in contact with a contact portion of each of the lower tools (constituting a tool layout) provided for the bending machine 101 side by side in the direction of the bending line of the workpiece W to be allowed to detect the bending angle of the workpiece W.

A more detailed description is given of the bending angle detecting devices 102.

The bending angle detecting devices 102 are provided on both sides of the tools P and D in the width direction and constitute a workpiece bending angle detecting system 104. Herein, the workpiece bending angle detecting device 102 provided on the operator side which is one side of the lower tool D in the width direction is described.

The workpiece bending angle detecting device 102 includes a first moving unit 111. The first moving unit 111 moves the detector 103 between a position PS1 of the detector 103 when the casing 109 of the detector 103 is fixed in contact with the contact portions of the lower tool D and a position PS3 of the detector 103 when the detector 103 is the farthest from the lower tool D.

In a state where the casing 109 of the detector 103 is in contact with the contact portions, the casing 109 of the detector 103 is pressed by the first moving unit 111 against the contact portions, so that the casing 109 of the detector 103 does not move relative to the contact portions.

Moreover, the workpiece bending angle detecting device 102 includes a second moving unit 113, which can move the detector 103 in the direction of the bending line of the workpiece W (which may be a direction including a component of the longitudinal direction of the lower tool D) when the detector 103 is the farthest from the lower tool D (positioned at the position PS3) so that the casing 109 of the detector 103 is brought into contact with and fixed to contact portions different from the aforementioned contact portions.

In the aforementioned workpiece bending angle detecting device 102, while bending is performed for the workpiece W with a pair of tools installed in the bending machine 101, the detector 103 is moved in the direction of the bending line of the workpiece W using the second moving unit 113 to be brought into contact with and fixed to at least two contact portions which are formed in the above pair of tools and apart from each other in the direction of the bending line of the workpiece W for measurement of the bending angle of the workpiece W.

Instead of the pair of tools, a plurality of sets of tools (sets of upper and lower tools) are arranged (tool sets are arranged) in the direction of the bending line of the workpiece W to constitute a tool layout. The bending angle of the workpiece W may be measured for each tool (for each tool set) in such a manner that the detector 103 is moved in the direction of the bending line of the workpiece W using the second moving unit 113 and brought into contact with and fixed to the contact portion of each lower tool constituting the tool layout.

The tool layout is used for complicated bending in which a single workpiece W is bent a plurality of times.

A more detailed description is given of the workpiece bending detecting device 102.

Figure 2:
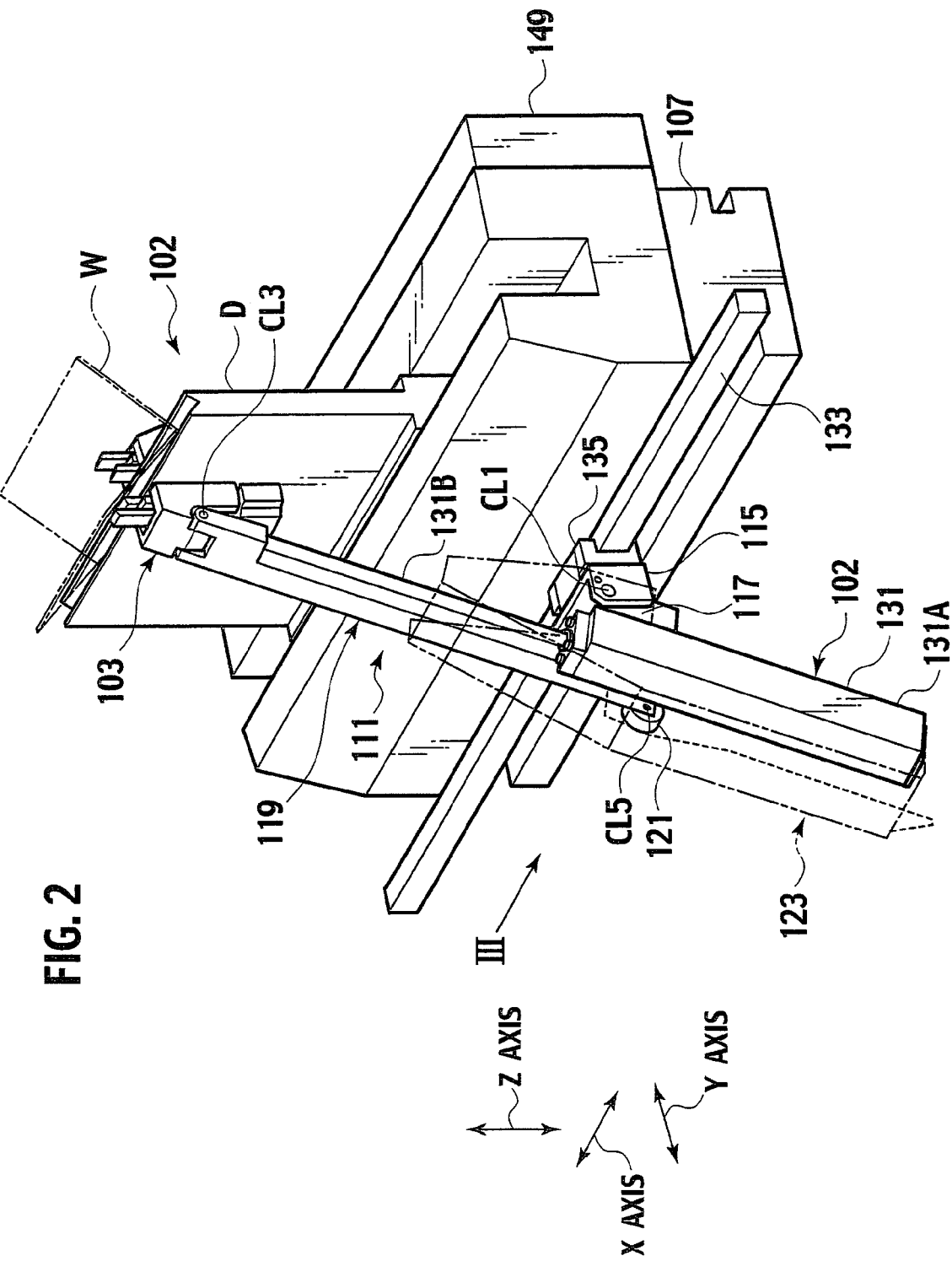
FIG. 2 is a perspective view showing a schematic structure of the workpiece bending angle detector provided on an operator side.
Figure 3:
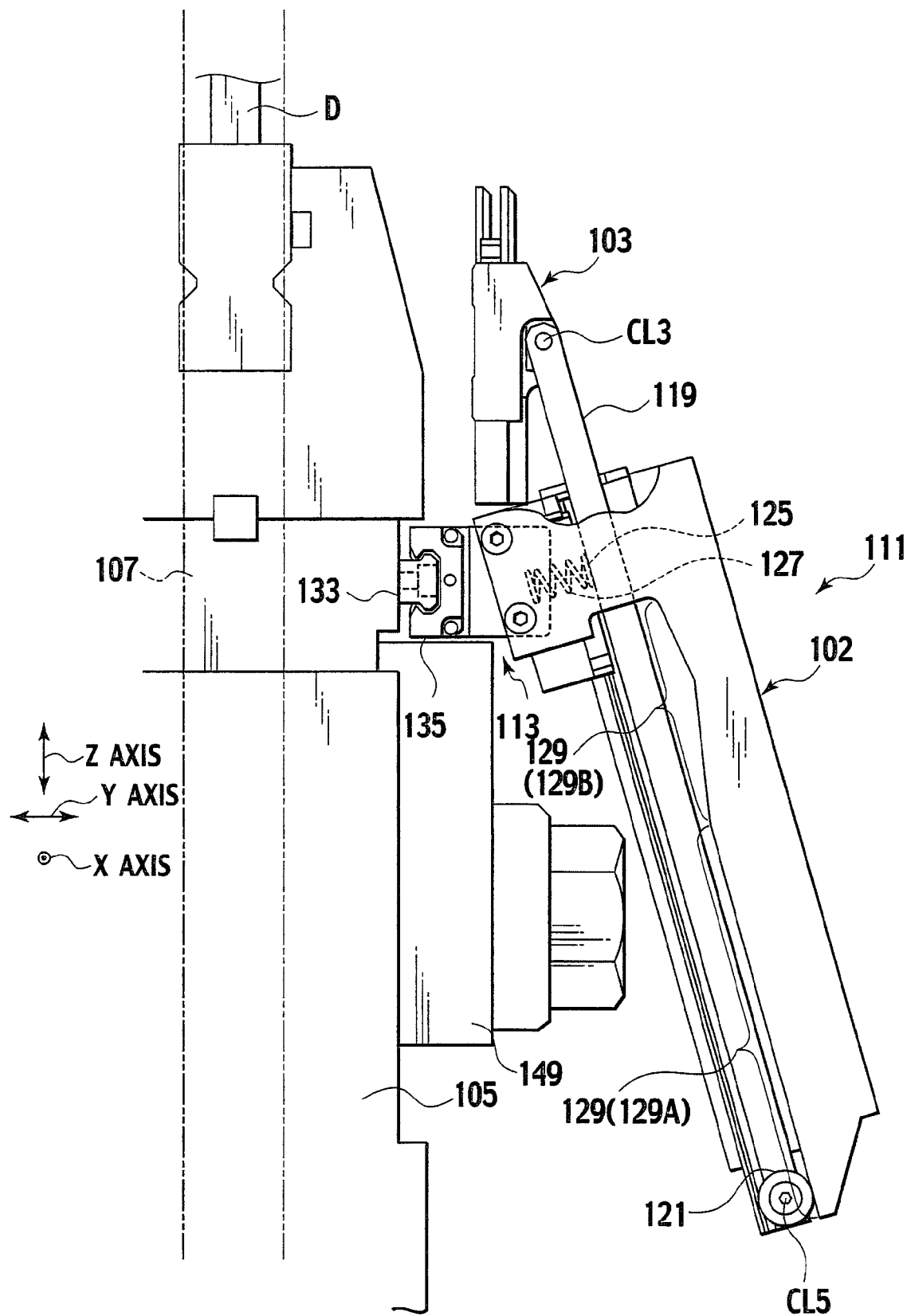
FIG. 3 is a view in a direction of an arrow III in FIG. 2.

FIG. 2 is a perspective view showing a schematic constitution of the workpiece bending angle detecting device 102 provided on the operator side, and FIG. 3 is a view in a direction of an arrow III in FIG. 2.

The contact portions with which the casing 109 of the detector 103 constituting the workpiece bending angle detecting device 102 provided on the operator side is brought into contact are formed in upper part of a side face of the lower tool D (a face developing in the vertical direction and the longitudinal direction of the lower tool D).

The first moving unit 111 diagonally moves the detector 103 from the lower retracted position PS3, where the detector 103 is the farthest from the lower tool D, to the upper contact position PS1, where the casing 109 of the detector 103 is fixed in contact with the contact portion.

Moreover, the first moving unit 111 linearly moves the detector 103 diagonally upward to the upper position PS1 on the side near the lower retracted position PS3 while moving the detector 103 on the side near the upper contact position PS1 so that a rising rate of the detector 103 is larger than a rate at which the detector 103 horizontally approaches the contact portion. Furthermore, in the vicinity of the contact position PS1, the first moving unit 111 moves the detector 103 substantially horizontally (see FIG. 1).

A more detailed description is given of the first moving unit 111.

As shown in FIG. 2, the first moving unit 111 includes a base member 117. Relative to a moving member 115, which can be moved by the second moving unit 113 in the direction (x-axis direction) that the bending line of the workpiece W extends, the base member 117 can rotate around an axis CL1, which extends in parallel to the bending line (extending in the x-axis direction) of the workpiece W.

The first moving unit 111 further includes a supporting member 119.

The supporting member 119 is formed into a long rod. On an end of the supporting member 119 in the longitudinal direction, the casing 109 of the detector 103 is supported so as to rotate around an axis CL3, which extends in parallel to the bending line of the workpiece W (extending in the x-axis direction).

The supporting member 119 can linearly move in the longitudinal direction thereof relative to the base member 117 so as to bring the detector 103 close to the lower tool D or away from the lower tool D. The longitudinal axis of the supporting member 119 is in a plane perpendicular to the bending line of the workpiece W.

On the other end of the supporting member 119 in the longitudinal direction, a cylindrical roller 121 is provided. The roller 121 is rotatable around an axis CL5, which extends in parallel to the bending line of the workpiece W (extends in the x-axis direction), relative to the supporting member 119.

The moving member 115 is integrally provided with a roller guiding member 123. The roller guiding member 123 is in contact with the outer periphery of the roller 121 to form a rolling pair. The roller guiding member 123 guides the supporting member 119 so as to linearly move the detector 103 on the side near the lower retracted position PS3 and moves the detector 103 on the side near the upper contact position PS1 so that the rising rate of the detector 103 is larger than the rate at which the detector 103 horizontally approaches the contact portions.

The first moving unit 111 includes a biasing unit 125, which biases the supporting member 119 so that the roller 121 is in contact with the roller guide member 123 regardless of the position of the supporting member 119. This biasing unit 125 is composed of, for example, a compression coil spring 127 and biases the supporting member 119 between the moving member 115 and the supporting member 119.

To be more specific, the supporting member 119 is supported at the longitudinally middle portion thereof by the base member 117 with a linear bearing (not shown) interposed therebetween so as to linearly move relative to the base member 117. The compression coil spring 127 biases the supporting member 119 in a direction between the other end of the supporting member 119 (the end where the roller 121 is provided) and a portion supported by the linear bearing. By such biasing, a rotational moment (a moment around an axis extending in the x-axis direction) is applied to the supporting member 119 around the rotation central axis CL1 of the base member 117 as a rotation center, so that the roller 121 is biased against the roller guiding member 123 to be in contact with the roller guiding member 123.

Furthermore, in the roller guide member 123, a guide section 129, which is in contact with the outer periphery of the roller 121 to guide the roller 121, is linearly formed in part (lower part) away from the portion biased by the compression coil spring 127 and formed into a concave continuous to the linear part in part (upper part) near the portion biased by the compression coil spring 127 (see a section 129B of FIG. 3). The detector 103 therefore linearly moves on the side near the retracted position PS3 and moves on the side near the contact position PS1 so that the rising rate of the detector 103 is larger than the rate at which the detector 103 horizontally approaches the contact portions.

The first moving unit 111 further includes an actuator to move the supporting member 119.

The actuator is composed of a fluid pressure cylinder 131 such as an air cylinder. A casing 131A of the fluid pressure cylinder 131 is integrally provided for the base member 117 so that the longitudinal directions of the fluid pressure cylinder 131 and supporting member 119 are substantially equal to each other. The fluid pressure cylinder 131 therefore rotates around the axis CL1, which is the same as the base member 117 (supporting member 119) rotates around. A top end portion of a piston rod 131B of the fluid pressure cylinder 131 is integrally connected to one end portion of the supporting member 119.

The roller guiding member 123 is formed by bending of a thin plate material or the like and serves as a cover covering the fluid pressure cylinder 131 and the like.

The second moving unit 113 includes a rail 133, which is extended longitudinally in the x-axis direction and integrally provided for the die holder 107, and a bearing 135, which is movably engaged with the rail 133. The bearing 135 is integrally provided with the moving member 115.

The bearing 135 and moving member 115 can be moved in the x-axis direction to be positioned by a not-shown actuator (a motor, a fluid pressure cylinder, or the like).

Next, a detailed description is given of the detector 103.

Figure 4:
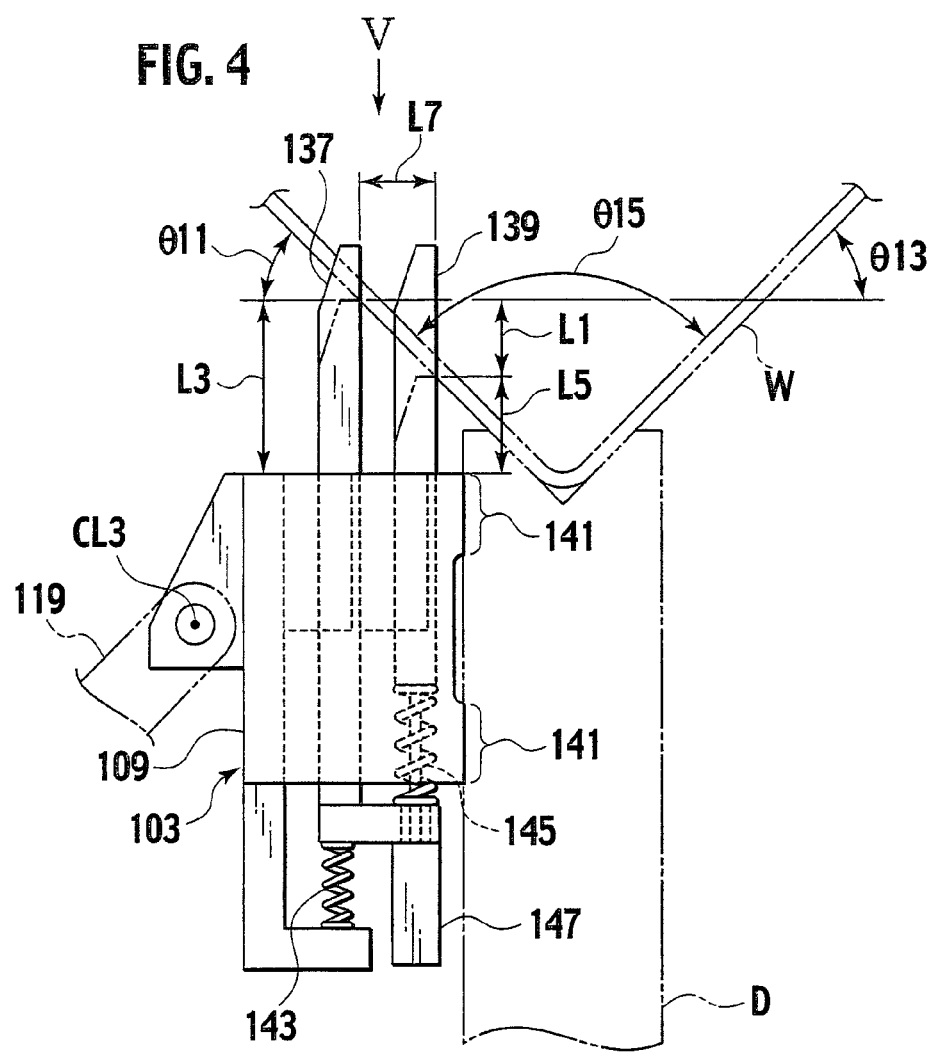
FIG. 4 is a view showing a schematic structure of a detector in the x-axis direction.

FIG. 4 is a view showing a schematic constitution of the detector 103, which is a view of the detector 103 in the x-axis direction.

Figure 5:
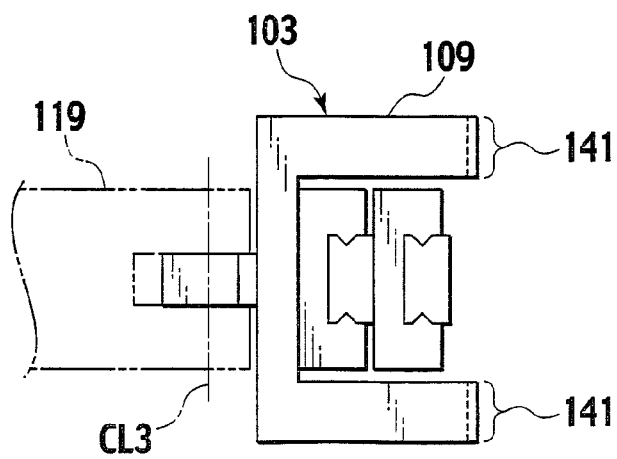
FIG. 5 is a view in a direction of an arrow IV in FIG. 4.

FIG. 5 is a view in the direction of an arrow IV in FIG. 4.

The detector 103 includes two contact elements 137 and 139, which linearly move relative to the casing 109. The detector 103 is configured so that the contact elements 137 and 139 move relative to the casing 109 to come into contact with the workpiece W and the detector 103 detects the bending angle of the workpiece W on the basis of the amounts of displacement of the contacts 137 and 139 when the contact elements 137 and 139 come into contact with the workpiece W.

To be more specific, the detector 103 includes the casing 109 with a rectangular solid exterior. The casing 109 is provided so as to have the width direction substantially equal to the longitudinal direction of the lower tool D.

The casing 109 is rotatably supported by the supporting member 119 at an end in a thickness direction (which meets the width direction of the die when the casing 109 is bought into contact with the lower tool D) as described above. Moreover, in a face of the casing 109 on the other side in the thickness direction, contact surfaces 141 which come into contact with the contact portions of the lower tool D are provided. These contact surfaces 141 are provided in upper and lower parts of the casing 109 in the longitudinal direction (which meets the height direction of the die when the casing 109 is brought into contact with the lower tool D). In other words, a recessed portion is formed in the middle of the contact surfaces 141 in the up-down direction. Accordingly, when the detector 103 is brought into contact with the contact portions by the first moving unit 111, the casing 109 of the detector 103 is brought into stable contact with the contact portions. The contact surfaces 141 are separately formed on both the sides of the casing 109 in the width direction.

Inside the casing 109, the first contact element 137 is provided so as to move relative to the casing 109 in the longitudinal direction of the casing 109. Moreover, inside the casing 109, similarly to the first contact element 137, the second contact element 139 is provided so as to move relative to the casing 109 in the longitudinal direction of the casing 109. The contact elements 137 and 139 are provided side by side in the thickness direction of the casing 109, the first contact element 137 being arranged on an end side (a side engaged with the supporting member 119) in the thickness direction of the casing 109, the second contact element 139 being arranged on the other end side of the casing 109 in the thickness direction (a side coming into contact with the lower tool D).

To be more specific, the first contact element 137 is composed of a first rail movably engaged with a first linear bearing integrally provided for an inner wall of the casing 109. The second contact element 139 is composed of a second rail movably engaged with a second linear bearing integrally provided for the first contact element. The contacts 137 and 139 can therefore move relative to casing 109.

Between the casing 109 and the first contact element 137, a first compression coil spring 143 which is an example of an elastic body is provided. The first compression coil spring 143 biases the first contact element 137 so that the first contact element 137 protrudes from upper part of the casing 109.

Furthermore, between the first and second contact elements 137 and 139, a second compression coil spring 145 which is an example of an elastic body is provided. The second compression coil spring 145 biases the second contact element 139 so that the second contact element 139 protrudes from upper part of the casing 109. The spring constant of the first compression coil spring 143 is larger than that of the second compression coil spring 145.

Between the first and second contact elements 137 and 139, a linear scale 147 as an example of a measuring unit which can measure a relative positional relationship between the first and second contact elements 137 and 139 is provided.

As shown in FIG. 4, when the casing 109 of the detector 103 is brought into contact with the lower tool D, the longitudinal direction of the casing 109 directs in the up-down direction; the thickness direction of the casing 109 directs in the width direction of the lower tool D; and the width direction of the casing 109 directs in the longitudinal direction of the lower tool D. Moreover, the tips of the contact elements 137 and 139 are brought into contact with the workpiece W and pressed by the workpiece W to move toward the inside of the casing 109 (downward).

When the workpiece W is bent as indicated by a chain double-dashed line in FIG. 4, a shoulder portion in an upper end of the first contact element 137 and a shoulder portion in an upper end of the second contact element 139 come into contact with the workpiece W, and an amount L1 of movement of the second contact element 139 relative to the first contact element 137 is measured by the linear scale 147.

For example, the amount L1 of movement is set to 0 when the shoulder portions of the upper ends of the first and second contact elements 137 and 139 are at the same height. The amount L1 of movement is calculated by subtracting height L5 (height from the upper end of the casing 109) of the shoulder portion of the second contact element 139 positioned below the shoulder portion of the upper end of the first contact element 137 from height L3 (height from the upper end of the casing 109) of the shoulder portion of the upper end of the first contact element 137.

For example, an insulator (not shown) may be interposed between the first rail constituting the first contact element 137 and the second bearing so that when the contact elements 137 and 139 are not in contact with the workpiece W, the contact elements 137 and 139 are electrically insulated from each other, and so that when the contact elements 137 and 139 are in contact with the workpiece W composed of a metal material such as steel to be electrically connected, the amount of movement (the difference in height) of the second contact element 139 relative to the first contact element 137 is measured.

Herein, the distance between the contact elements 137 and 139 (distance in the thickness direction of the casing 109) is known, and a bending angle $\theta 11$ of the workpiece W is calculated from the distance between the contact elements 137 and 139 and amount L1 of movement of the second contact element 139 relative to the first contact element 137 by the following equation f1 (Equation f1; $\theta 11 = \arctan(L1/L7)$).

The detector 103 includes two contact elements but may include three or more contact elements. In other words, the detector 103 only needs to include at least two contact elements. The bending angle of the workpiece W may be detected on the basis of the amount of displacement between at least two of the contact elements.

The second contact element 139 may be biased by a compression coil spring provided between the casing 109 and the second contact element 139 instead of the compression coil spring 145 provided between the first and second contact elements 137 and 139. Moreover, the amount of movement of the second contact element 139 relative to the first contact element 137 may be calculated by measuring the positions of the first and second contact elements 137 and 139 relative to the casing 109 with first and second linear scales, respectively, and using the difference between the measured values of the first and second liner scales.

Hereinabove, the description is given of the workpiece bending angle detecting device 102 provided on the operator side. However, on the backgauge side of the bending machine 101 (the side opposite to the operator side), as previously described, another workpiece bending angle detecting device 102 is provided, which is constituted in the same manner as the workpiece bending angle detecting device 102 provided on the operator side is (see FIG. 2).

The first moving unit 111, which moves the detector 103 on the operator side in the workpiece bending angle detecting device 102 provided on the operator side which is one side of the lower tool D in the width direction, is configured to move the detector 103 more steeply than the first moving unit 111 moves the detector 103 on the backgauge side in the workpiece bending angle detecting device 102 provided on the backgauge side which is the other side of the lower tool D in the width direction.

In other words, as shown in FIG. 2, the position of the casing 109 of the detector 103 provided on the backgauge side which is one side of the lower tool D in the width direction when the detector 103 on the backgauge side is positioned farthest from the lower tool D is farther from the lower tool D of the lower tool D in the width direction than the position of the casing 109 of the detector 103 provided on the operator side which is the other side of the lower tool D in the width direction when the detector 103 on the operator side is positioned farthest from the lower tool D.

The positions of the casings 109 of the detectors 103 on the backgauge and operator sides when the detectors 103 are in contact with the contact portions of the lower tool D are substantially the same in the height direction.

As previously described, a real workpiece bending angle $\theta 15$ can be calculated from the bending angle $\theta 11$ of the workpiece W obtained by the detector 103 on the operator side and the bending angle $\theta 13$ of the workpiece W obtained by the detector 103 on the backgauge side (see FIG. 4). The bending angle $\theta 15$ is calculated by the following equation f3 (Equation f3; $\theta 15 = 180° - \theta 11 - \theta 13$)

Next, a description is given of an operation of the bending machine 101.

The bending machine 101 and bending angle detecting device 102 operate under the control of the controller.

Figure 6:
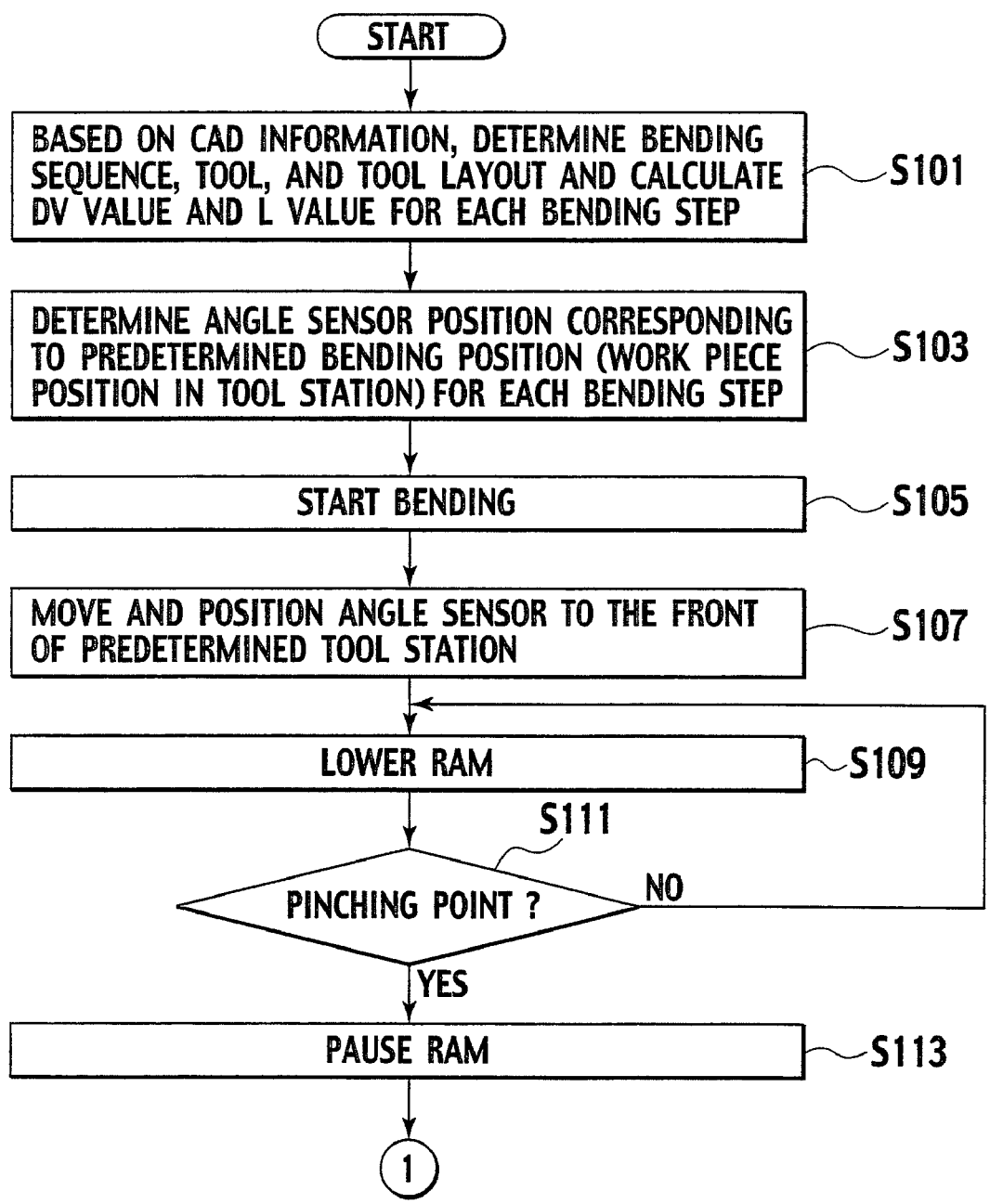
FIG. 6 is a flowchart showing an operation of the bending machine.
Figure 7:
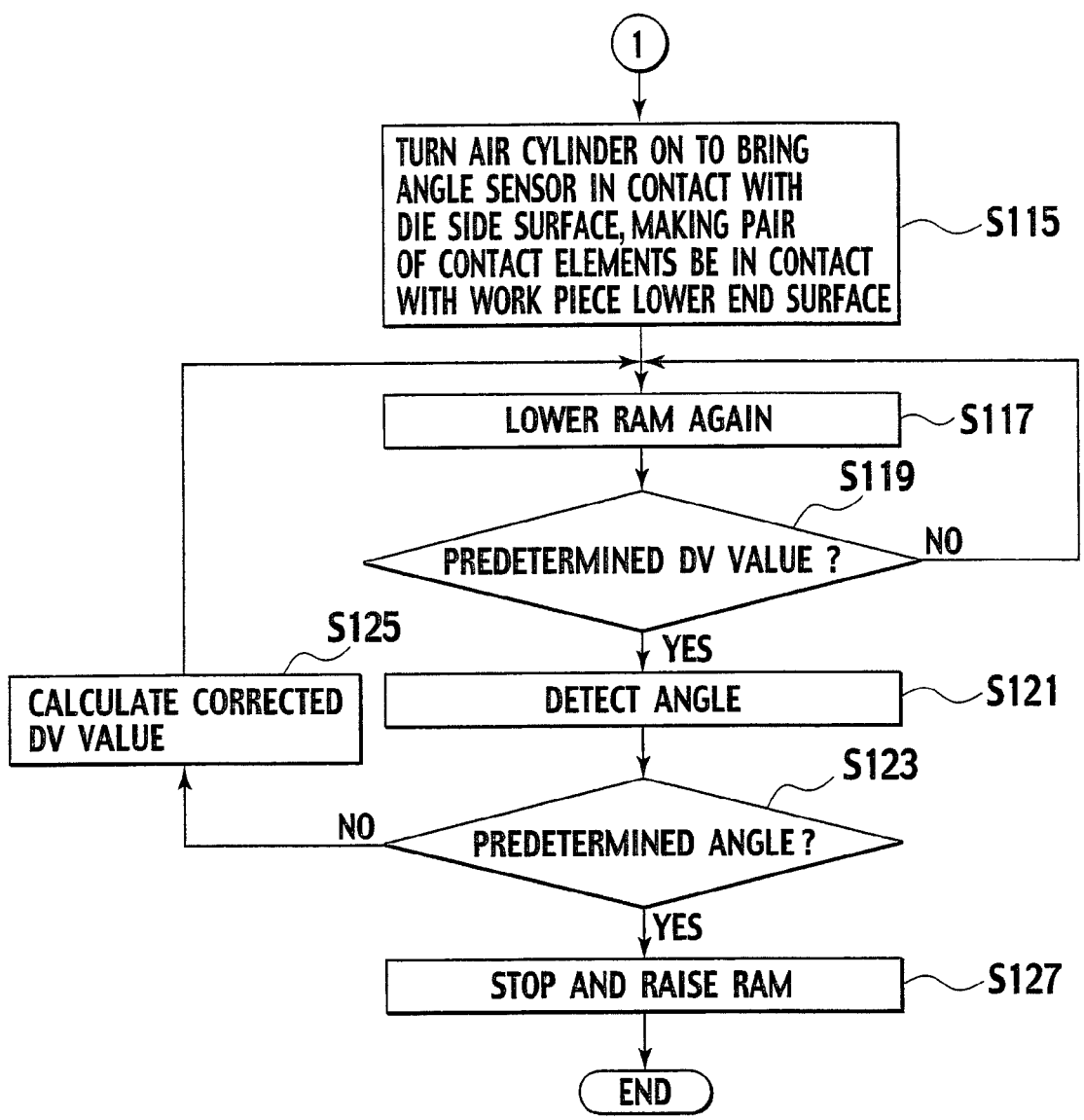
FIG. 7 is a flowchart showing an operation of the bending machine.

FIGS. 6 and 7 are flowcharts showing the operation of the bending machine 101.

Herein, the description is given of the operation in bending the workpiece W using the tool layout.

First, in step S101, using CAD information, a bending sequence of the workpiece W, tools, and a tool layout are determined manually or automatically, and a DV value (a distance between the die D and punch P in bending) and an L value (a position of the backgauge against which the workpiece W is butted) are manually or automatically calculated for each process.

In step S103, the position of the bending angle detecting device 102 corresponding to a predetermined bending position (a position of the workpiece W in a tool station) is determined for each process. In other words, the positions of the contact portions located in the direction of the bending line of the workpiece W are determined.

In step S105, after the preparation, processing is started. In step S107, the detectors 103 are moved to the positions determined in the step S103 by the second moving unit 113.

In step S109, the ram (upper table) starts lowering, and in step S111, it is detected for judgment by, for example, a linear sensor (not shown) which is capable of detecting the position of the ram whether the punch P and the upper surface of the workpiece W are in contact with each other (whether the punch P is lowered to the pinching point).

When it is judged in the step S111 that the punch P is lowered to the pinching point, the lowering of the ram is paused in step S113.

In step S115, the fluid pressure cylinder (for example, air cylinder) 131 of the first moving unit 111 is turned on to extend the piston rod 131B toward the die D, bring the casing 109 of the detector 103 into contact with the contact portion of the die D, and fix the casing 109.

As the piston rod 131B extends toward the die D, the supporting member 119 linearly moves diagonally upward relative to the moving member 115 when the detector 103 is positioned on the side near the lower retracted position PS3, and the supporting member 119 linearly moves diagonally upward relative to the moving member 115 while swinging around the central axis CL1 so that a side of the supporting member 119 supporting the detector 103 moves downward when the detector 103 is positioned on the side near the upper contact position PS1.

When the casing 109 comes into contact with the side face of the lower tool D, the detector 103 rotates relative to the supporting member 119 around the central axis CL3 to fit to the side face of the lower tool D.

In step S117, the ram starts lowering again, and the workpiece W starts to be bent. The contact elements 137 and 139 follow the workpiece W being bent.

In step S119, it is detected whether the position of the ram reaches a predetermined DV value. When the position of the ram reaches the predetermined DV value, the bending angle of the workpiece W is detected using the detector 103.

In step S123, it is detected whether the bending angle of the workpiece W reaches a predetermined value. When the bending angle does not reach the predetermined bending angle, the DV value is corrected in step S125, and the procedure returns to the step S117. When the bending angle reaches the predetermined bending angle, the procedure goes to step S127.

In the step S127, the ram is stopped lowering and raised. When the workpiece W is subjected to bending with subsequent different tools, the procedure returns to step S103. When the workpiece W is not subjected to bending with subsequent different tools, the bending process of the workpiece W is terminated.

In the aforementioned operation, the bending angle of the workpiece W is detected using the bending angle detecting device 102 provided on each side of the die D in the width direction.

Specifically, in the operation shown in the above steps S115 to 125, the casing 109 of the first detector (detector 103 of the bending angle detecting device 102 on the operator side) is fixed in contact with a side face of the lower tool D on one side located near the portion of each tool performing bending for detection of the bending angle of the workpiece W on one side. Moreover, the casing 109 of the second detector (detector 103 of the bending angle detecting device 102 on the backgauge side) is fixed in contact with a side face of the lower tool D on the other side located near the portion of each tool performing bending for detection of the bending angle of the workpiece W on the other side.

Subsequently, on the basis of a result of the detection of the bending angle, the bending angle of the workpiece W is measured, and according to the measured bending angle of the workpiece W, the distance between the lower tool D and upper tool P (DV value) is corrected.

In the aforementioned operation, the description is given of the case of bending the workpiece using a tool layout. However, the bending angle of the workpiece W may be detected in the direction of the bending line of the workpiece W when the workpiece W is bent using a pair of tools.

In such a case, in the step S119, the casing 109 of the detector 103 may be brought into contact with a plurality of contact portions (contact portions formed in a single lower tool) apart from one another in the direction of the bending line of the workpiece W for detection of the bending angle of the workpiece W.

According to the bending machine 101, the bending angle of the workpiece W is detected with the casing 109 of the detector 103 fixed in contact with the contact portions of the lower tool D located near the portion of each tool performing bending. Accordingly, the bending angle of the workpiece W can be accurately measured.

To be more specific, the side face of the lower tool D in which the contact portions are formed serves as the processing reference for forming a V-shaped section of the lower tool coming into contact with the workpiece W for bending, for example by grinding and therefore has high positional accuracy with respect to the V-shaped section. The bending angle of the workpiece W is measured with the detector 103 of the casing 109 in contact with the side surface of the lower tool D with high accuracy. The bending angle of the workpiece W can be therefore measured with high accuracy.

According to the bending machine 101, the bending angle of the workpiece W is measured with the detector 103 fixed in contact with the side face of the lower tool D through at least two contact portions apart from each other in the direction of the bending line of the workpiece W, or the bending angle of the workpiece W is measured with the detector 103 fixed in contact with the contact portion of each of the lower tools D arranged in the bending machine 101 side by side in the direction of the bending line of the workpiece W. The bending angle of the workpiece W is thus measured with the casing 109 of the detector 103 fixed in contact with the side face of the lower tool D processed with high accuracy. Accordingly, even when the detector 103 cannot accurately move in the direction of the bending line of the workpiece W because of low accuracy of the guide rail and the like the conventional bending machine, it is possible to measure the bending angle of the workpiece W with high accuracy without complicating the constitution of the bending angle detecting device 102.

Furthermore, according to the bending machine 101, the first moving unit 111 is configured to linearly move the detector 103 on the side near the lower retracted position PS3 side and move the detector 103 on the side near the upper contact position PS1 so that the rising rate of the detector 103 is higher than the rate at which the detector 103 horizontally approaches the contact portions. Accordingly, the detector 103 can be moved while avoiding the interference with the lower tool D and die holder 107. Moreover, moving the detector 103 substantially horizontally in the vicinity of the contact position PS1 allows the casing 109 of the detector 103 to come into contact with part at the substantially same height (a part of the side face of the lower tool D) for detecting the bending angle of the workpiece W even if the lower tool D changes in width. The bending angle of the workpiece W can be measured with high accuracy regardless of the width of the lower tool D.

Still furthermore, according to the bending machine 101, the bending angle detecting device for the workpiece W is provided on each side of the tools P and D in the width direction. It is therefore possible to measure the real bending angle θ15 of the workpiece W as described above.

Still furthermore, according to the bending machine 101, the detector 103 on the operator side is configured to move more steeply than the detector moves on the backgauge side.

The detectors 103 can be therefore properly moved according to the form and usability of the bending machine.

In other words, moving the detector 103 steeply on the operator side can reduce protrusion of the bending angle detecting device 102 on the operator side toward the operator, thus improving the usability.

On the other hand, on the backgauge side, a holding mechanism 149 holding the lower tools D is provided in the side part of the die holder 107 (see FIG. 2), the detector 103 can be moved while avoiding the interference with the holding mechanism 149.

Second Embodiment

A bending machine according to a second embodiment is different from the bending machine 101 according to the first embodiment in that the detector is configured to detect the bending angle of the workpiece W using light without being in contact with the workpiece W. The bending machine according to the second embodiment has substantially the same constitutions in the other points as those of the bending machine 101 according to the first embodiment and provides substantially the same effects.

Herein, a description is given of a detector 4 according to the second embodiment.

Figure 10:
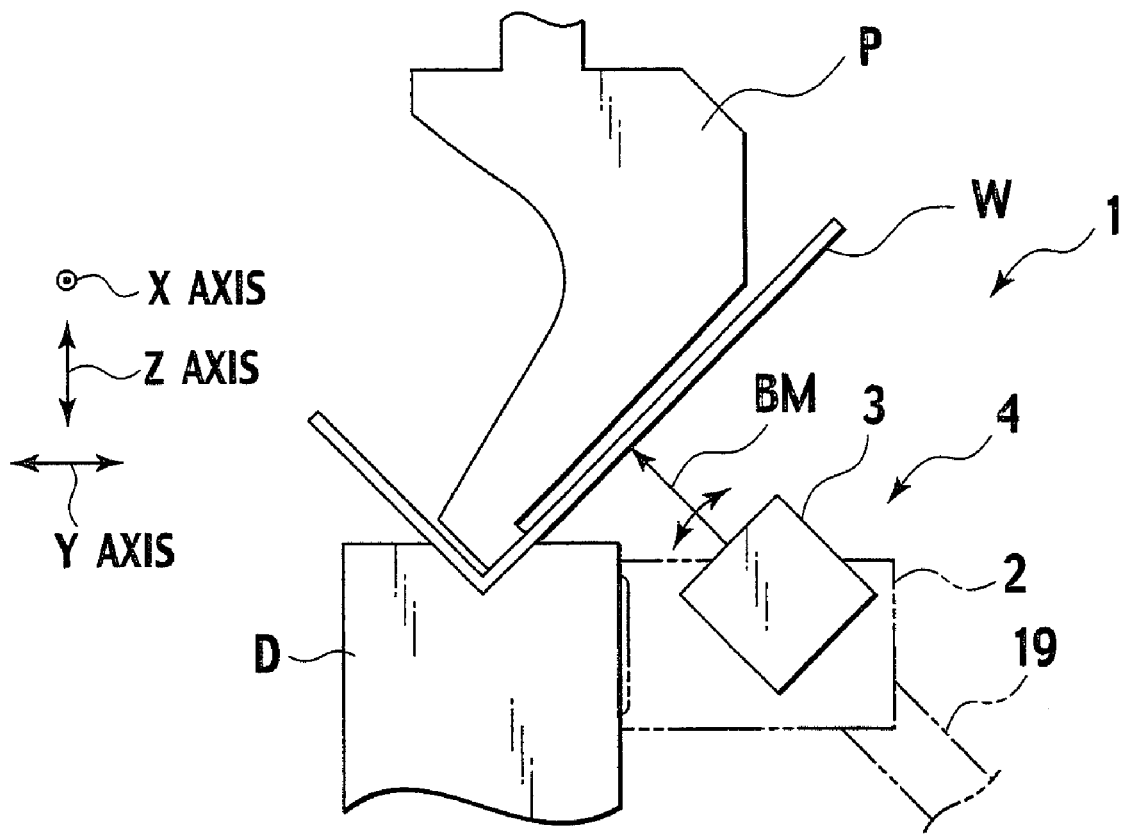
FIG. 10 is a side view showing a structure and movement of a sensor head.

FIG. 10 shows a sensor head 3 and a casing 2 constituting the detector 4 in a bending angle detecting device 102. The casing 2 is constituted in substantially the same manner as the casing 109 of the detector 103 of the bending machine 101 according to the first embodiment is and is rotatably supported on a supporting member 19.

With reference to FIGS. 11(A) and 11(B), in the center of a front face 7 of the sensor head 3, an optical transmitter 9 as a light source which emits a laser beam BM as a detection beam in a direction orthogonal (perpendicular) to the front face 7 is provided. In the front face 7 of the sensor head 3, first and second optical receivers 11 and 13 which are optical sensors are provided at equal distances from the optical transmitter 9 with the optical transmitter 9 interposed therebetween. Specifically, the light source 9 and the plurality of optical sensors 11 and 13 are arranged in a same plane including an optical axis of the laser beam BM emitted from the light source 9, and the sensor head 3 is rotatable relative to the casing 19 in the above plane (around an axis RC extending in the x-axis direction).

In this embodiment, the optical censors 11 and 13 are provided at equal distances symmetrically with respect to the light source 9 interposed therebetween. However, the optical sensors 11 and 13 are not necessarily provided at symmetric positions. The optical sensors 11 and 13 can be used for detecting the bending angle of the workpiece W if the optical sensors 11 and 13 are positioned opposite to each other with the light source 9 interposed therebetween and the distances between the light source 9 and the optical sensors 11 and 13 are previously known.

Figure 13:
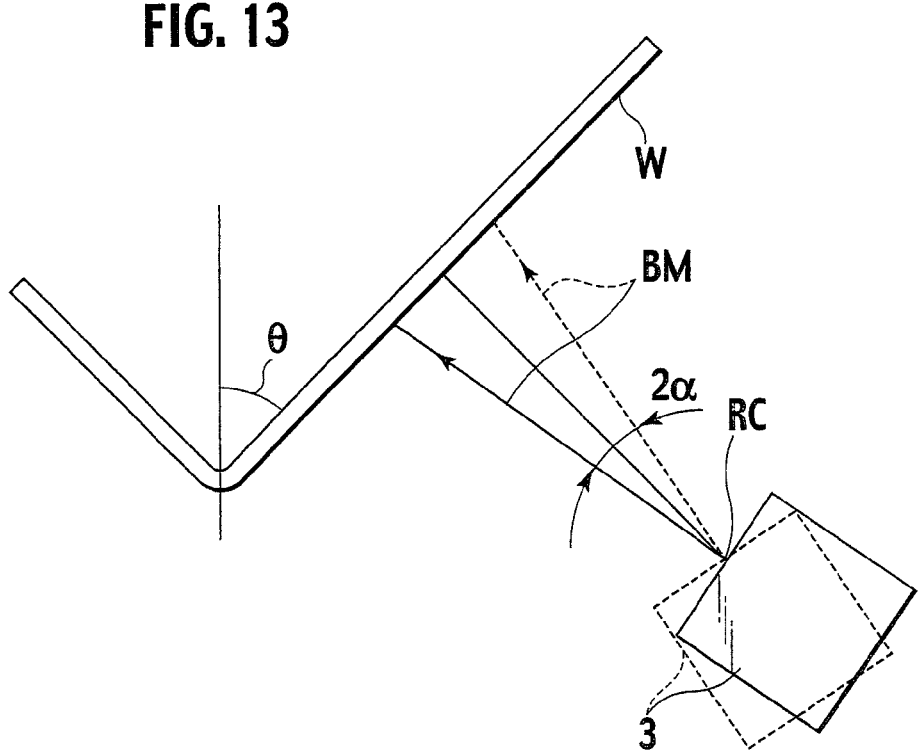
FIG. 13 is an explanatory view showing movement of the sensor head in the angle detecting device.

Additionally referring to FIG. 13, the aforementioned rotation axis RC is coaxial with the optical axis of the laser beam BM emitted from the optical transmitter 9, orthogonal to the laser beam BM, and perpendicular to a plane including the optical axis of the laser beam BM, optical transmitter 9, first and second optical receivers 11 and 13. The sensor head 3 is rotated by a not-shown driving device around the rotation axis RC.

Figure 8:
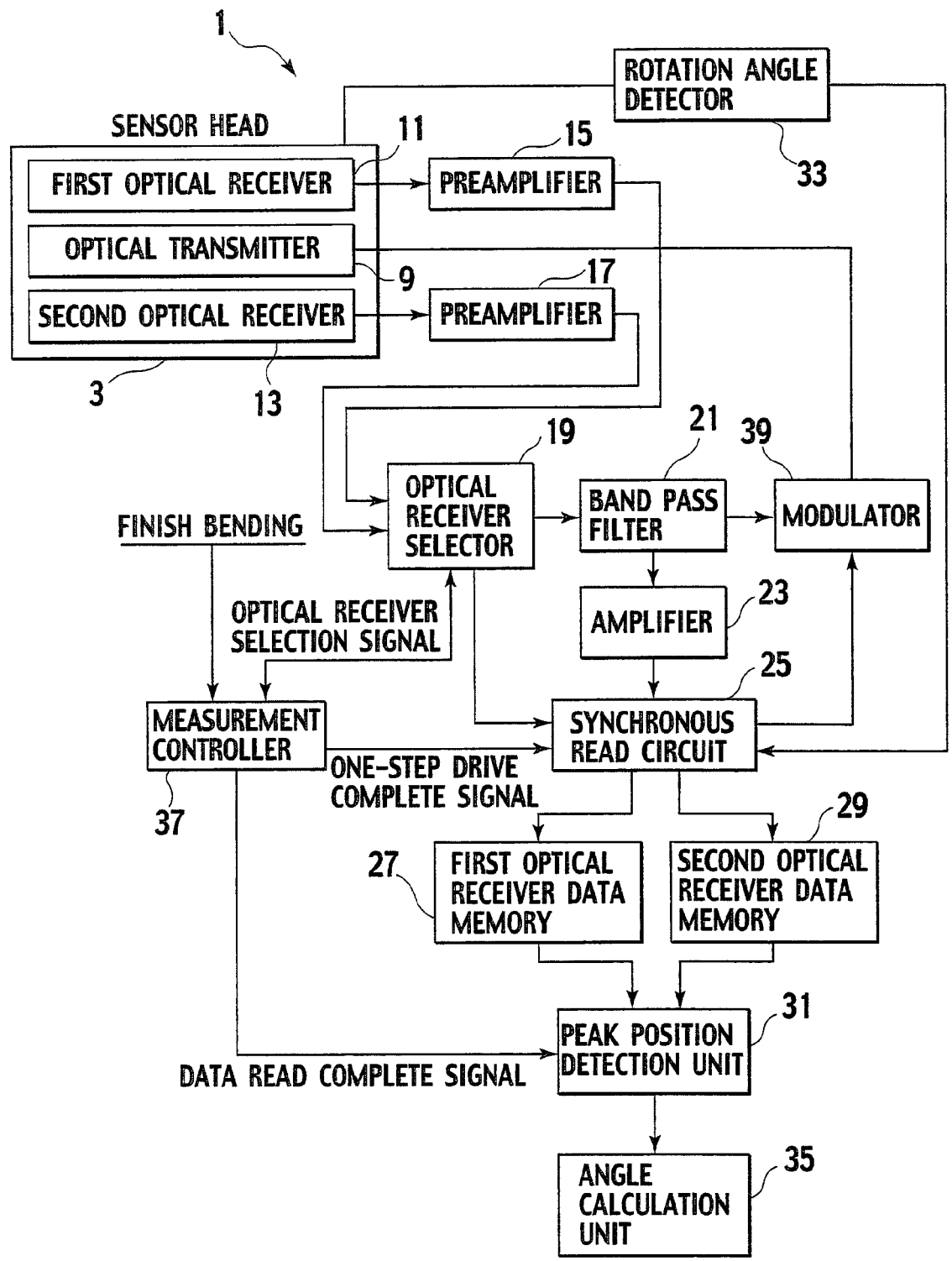
FIG. 8 is a block diagram showing an angle detecting device for a folding machine.

Next, referring to FIG. 8, a description is given of a functional configuration of a control system of the angle detecting device 102 for a folding machine (bending machine). The first and second optical receivers 11 and 13 are respectively connected through preamplifiers 15 and 17 to an optical receiver selector 19, with which a light reception signal from any one of the first and second optical receivers 11 and 13 is selected.

The selected light reception signal has only signals having a predetermined band of frequencies passed through a band-pass filter 21 and is then amplified by an amplifier 23 to be inputted to a synchronous read circuit 25.

The synchronous read circuit 25 memorizes light reception data in one of first and second data memories 27 and 29 in synchronization with the emission of the laser beam BM from the optical transmitter 9, and on the basis of the light reception data, a peak value detecting unit 31 detects a peak value of the light reception signal. Moreover, a rotation angle detection unit 33 calculates a rotation angle of the sensor head 3, and then an angle calculation unit 35 calculates the bending angle of the workpiece W.

Specifically, upon receiving a signal indicating completion of bending from the controller controlling a folding machine (bending machine) such as a press brake, a measurement control unit 37 sends the optical receiver selection signal to the optical receiver selector 19 to select one of the first and second optical receivers 11 and 13 to rotate the sensor head 3 by a predetermined rotation angle for one-step drive and sends a one-step drive completion signal, thus synchronizing sampling of the light reception data with the rotation angle of the sensor head 3. The synchronous of the synchronous read circuit 25 is synchronous with a modulation signal in a modulator 39.

Figure 11:
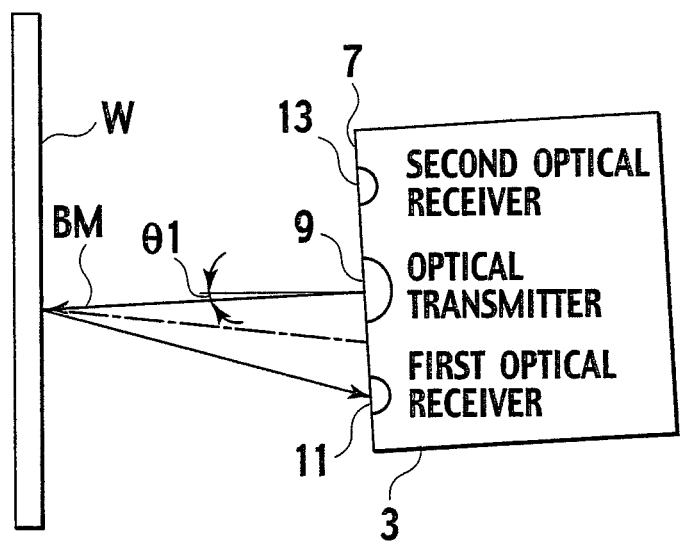
FIGS. 11A and 11B are explanatory views showing movement of a detection beam by the sensor head.
Figure 11:
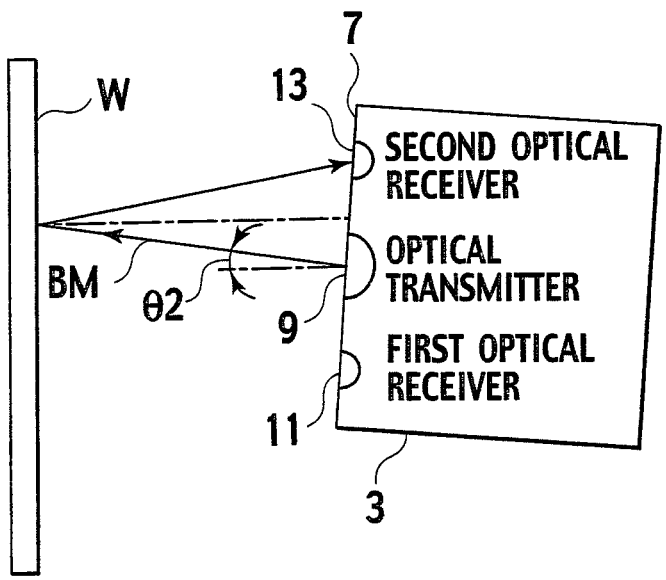
Figure 12:
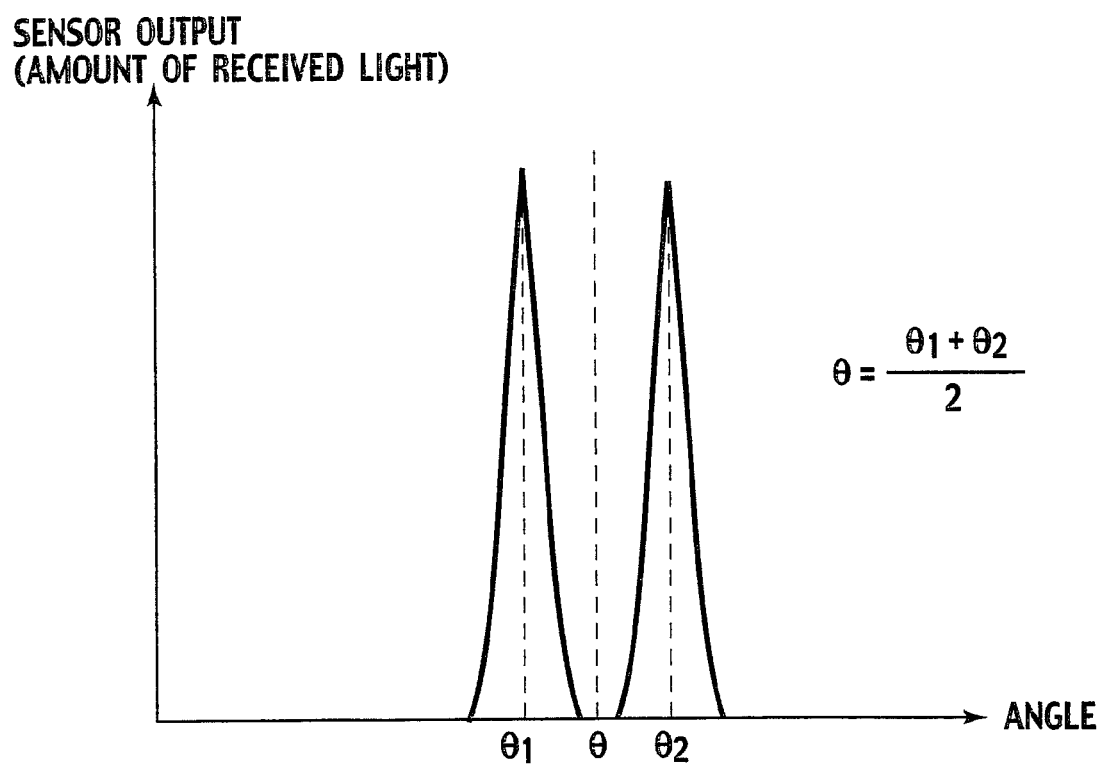
FIG. 12 is a graph showing a change in an amount of light received by an optical receiver with respect to rotation angle of the sensor head.

Next, with reference to FIGS. 11 and 12, a description is given of a principle of detecting a bending angle 2·θ of the workpiece W.

Referring to FIG. 11(A), when the sensor head 3 rotates to such a position that the rotation angle is θ1 as shown in the drawing, the laser beam BM irradiating the surface of the workpiece W from the optical transmitter 9 is reflected, and the amount of reflected light received by the first optical transmitter 11 is maximized. Referring to FIG. 11(B), when the sensor head 3 rotates to such a position that the rotation angle is θ2 in a similar manner, the amount of reflected light received by the second optical transmitter 13 is maximized. FIGS. 11(A) and 11(B) show a case where a referential angle is 0 degree (or horizontal).

FIG. 12 shows changes in the amount of reflected light received with respect to rotation angle of the sensor head 3, which reveals in general that the amount of light received by the first optical receiver 11 is maximized when the inclination angle of the sensor head 3 is θ1 counterclockwise relative to the reference angle θ (θ=0 in the example shown in FIGS. 11(A) and 11(B)) and that the amount of light received by the second optical receiver 13 is maximized when the inclination angle of the sensor head 3 is θ2 clockwise relative to the reference angle θ.

The first and second optical receivers 11 and 13 are provided at equal distances from the optical transmitter 9 as described above. Accordingly, in FIG. 12, the laser beam BM is projected onto the bent workpiece W at right angles in the middle between the rotation angle θ1 of the sensor head 3 from the horizontal position (θ=0) when the amount of light received by the first optical receiver 11 is maximized and the rotation angle θ2 of the sensor head 3 from the horizontal position (θ=0) when the amount of light received by the second optical receiver 13 is maximized. The angle θ of the folded workpiece W is therefore obtained by θ=(θ1+θ2)/2. Herein, with regard to θ1 and θ2, for example, clockwise angle is set positive, and counterclockwise angle is set negative.

Figure 9:
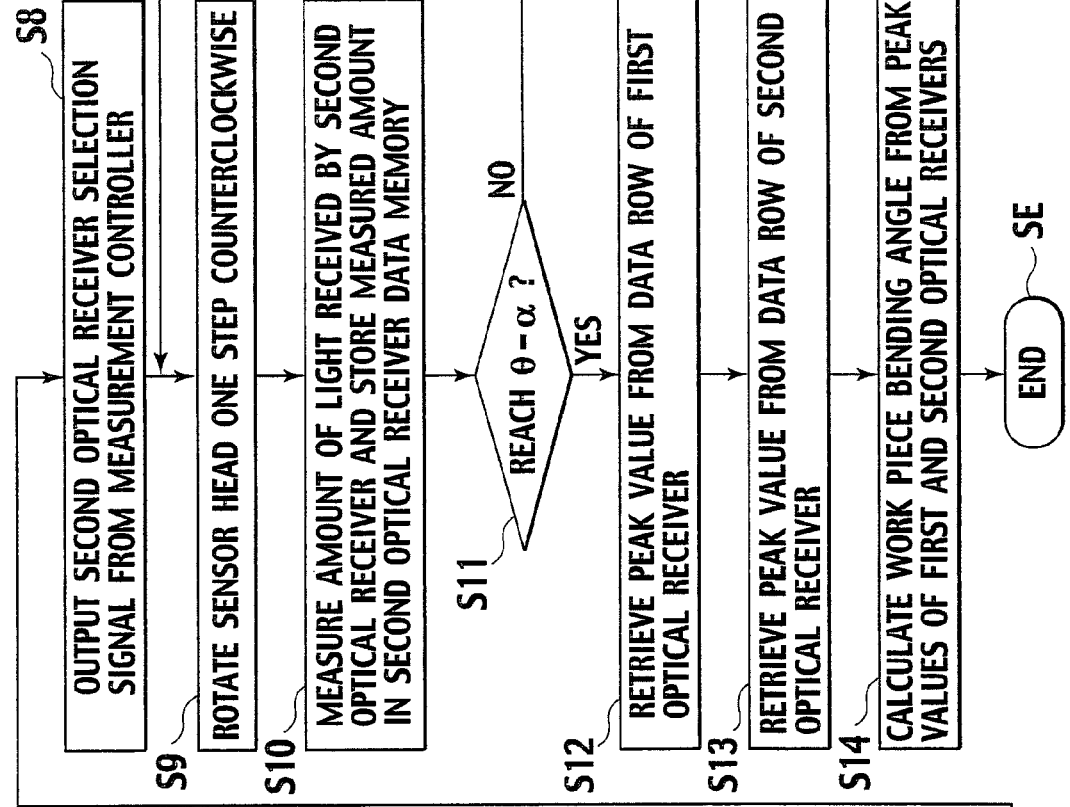
FIG. 9 is a flowchart showing a procedure of a folding machine angle detecting method.
Figure 9:
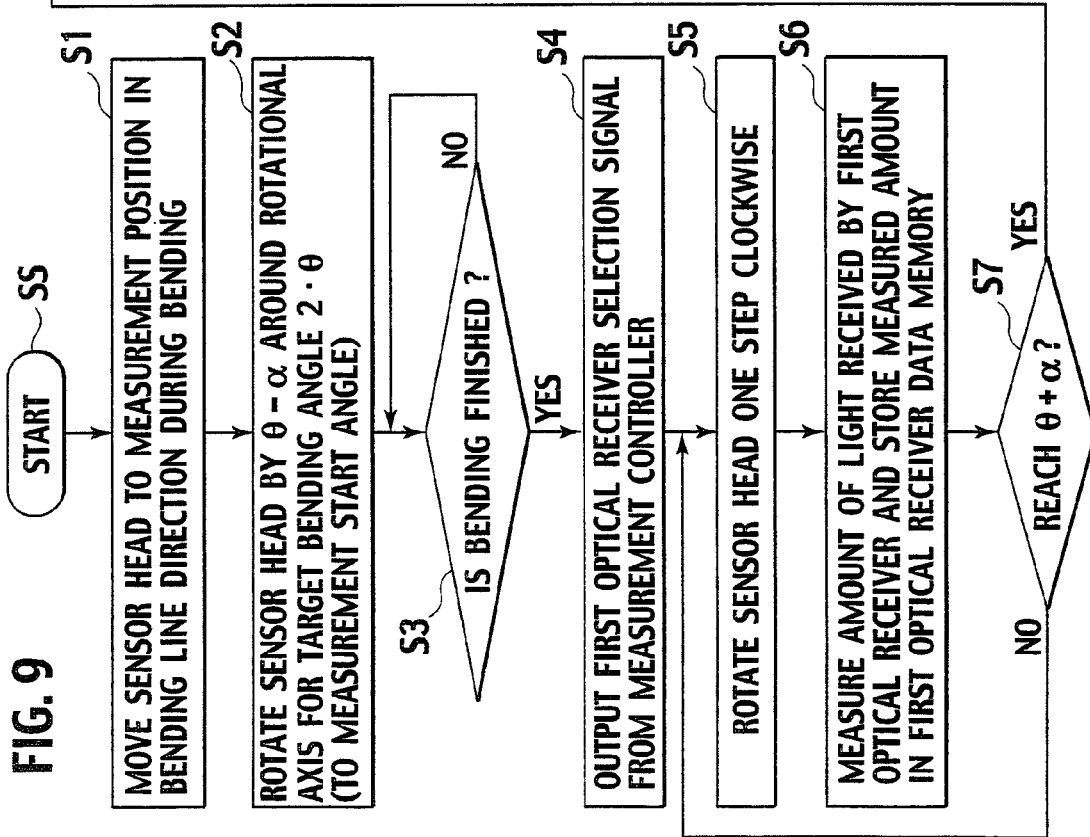

Next, a description is given of a procedure of a method of calculating a folding angle of the workpiece W using the aforementioned angle detecting device 102 with reference to FIGS. 8, 9, and 13.

First, when an angle detection operation is started (step SS), the sensor head 3 is moved to a measuring position in parallel to the bending line by a not-shown moving device during bending (step S1). The sensor head 3 is rotated around the rotation axis RC by $\theta-\alpha$ (see FIG. 13) for a target bending angle $2\cdot\theta$ to prepare for the angle detection operation (step S2). Herein, the target bending angle $\theta$ is set considering an amount of spring-back so that the workpiece W is surely positioned between $\theta\pm\alpha$.

When the bending is completed (step S3), the measurement control unit 37 outputs a first optical receiver selection signal to an optical receiver selector 19 to select the first optical receiver 11 (step S4). The sensor head 3 positioned at $\theta-\alpha$, which is a measurement start angle, is rotated clockwise by a predetermined angle step by step by a not-shown rotation driving device (step S5). At this time, the measurement control unit 37 outputs an one-step drive completion signal to the synchronous read circuit 25, measures the amount of light received by the first optical receiver 11 in synchronization with the rotation of the sensor head 3, and stores the data in the first optical receiver data memory 27 (step S6).

The steps after the step S4 are repeated until the rotation angle of the sensor head 3 reaches $\theta+\alpha$. When the rotation angle reaches $\theta+\alpha$ (step S7), the measurement control unit 37 outputs a second optical receiver selection signal to the optical receiver selector 19 to select the second optical receiver 13 (step S8). Herein, the value of $\alpha$ is set on the basis of the distances between the optical transmitter 9 and the first and second optical receivers 11 and 13, the distance between the sensor head 4 and the workpiece W measured, and the like and set to, for example, about 10 degrees.

The sensor head 3 rotationally moved to the $\theta+\alpha$ position because of the measurement by the first optical receiver is rotated counterclockwise by a predetermined angle step by step by a not-shown rotation driving device (step S9). At this time, the measurement control unit 37 outputs a one-step drive completion signal to the synchronous read circuit 25, measures the amount of light received by the second optical receiver 13 in synchronization with the rotation of the sensor head 3, and stores the data in the second optical receiver data memory 29 (step S10).

The steps after the step S8 are repeated until the rotation angle of the sensor head 3 reaches $\theta-\alpha$. When the rotation angle reaches $\theta-\alpha$ (step S11), the peak value detection unit 31 retrieves the peak value of the amount of light received by the first optical receiver 11 from a row of data stored in the first optical receiver data memory 27 (step S12). In a similar manner, the peak value detection unit 31 retrieves the peak value of the amount of light received by the second optical receiver from a row of data stored in the second optical receiver data memory 29 (step S13).

From the angle $\theta1$ of the sensor head 3 corresponding to the thus-obtained peak value of the first optical receiver 11 and the angle $\theta2$ of the sensor head 3 corresponding to the thus-obtained peak value of the second optical receiver 13, the angle calculation unit 35 calculates the folding angle $\theta$ of the workpiece W (step S14). The angle detecting operation is then terminated (step SE).

Moreover, in the above description, the folding angle of the workpiece W is detected by calculating the middle position between the rotational position of the sensor head 3 where the amount of light received by the first optical receiver 11 is the peak value and the rotational position of the sensor head 3 where the amount of light received by the second optical receiver 13 is the peak value. However, it is possible to detect the rotational position of the sensor head 13 where the amounts of light received by the first and second optical receivers 11 and 13 are equal to each other and detect the folding angle of the workpiece W on the basis of the detected rotational position.

The above case can be easily implemented by simultaneously detecting the reflected beam of the laser beam irradiating the workpiece W from the optical transmitter 9 by means of the first and second optical receivers 11 and 13; providing a comparison unit comparing whether the detected values of the first and second optical receivers 11 and 13 are equal; and positively and negatively operating a motor so that comparison results of the comparison unit are equal to each other.

FIGS. 14 to 18 show another embodiment.

Figure 16:
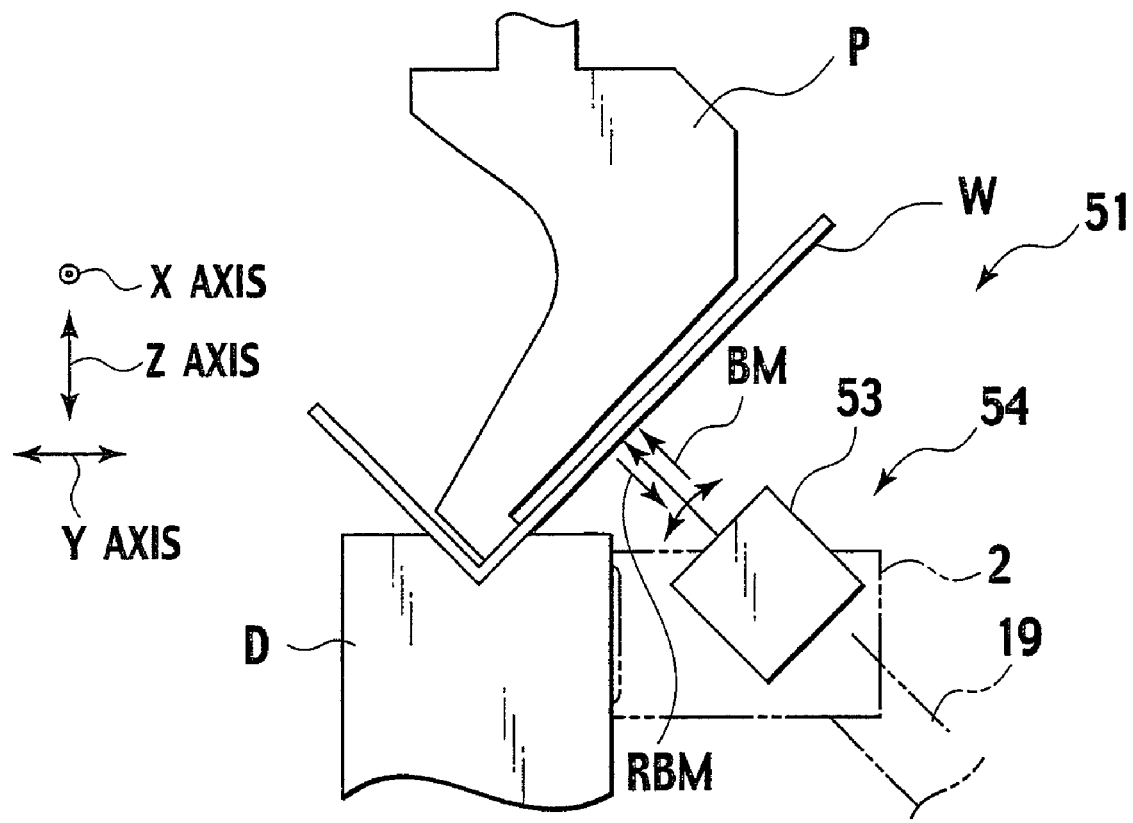
FIG. 16 is a side view showing a structure and movement of the sensor head.

In FIG. 16, in a casing 2, a sensor head 53 of an angle detecting device 51 is rotatably provided.

Figure 14:
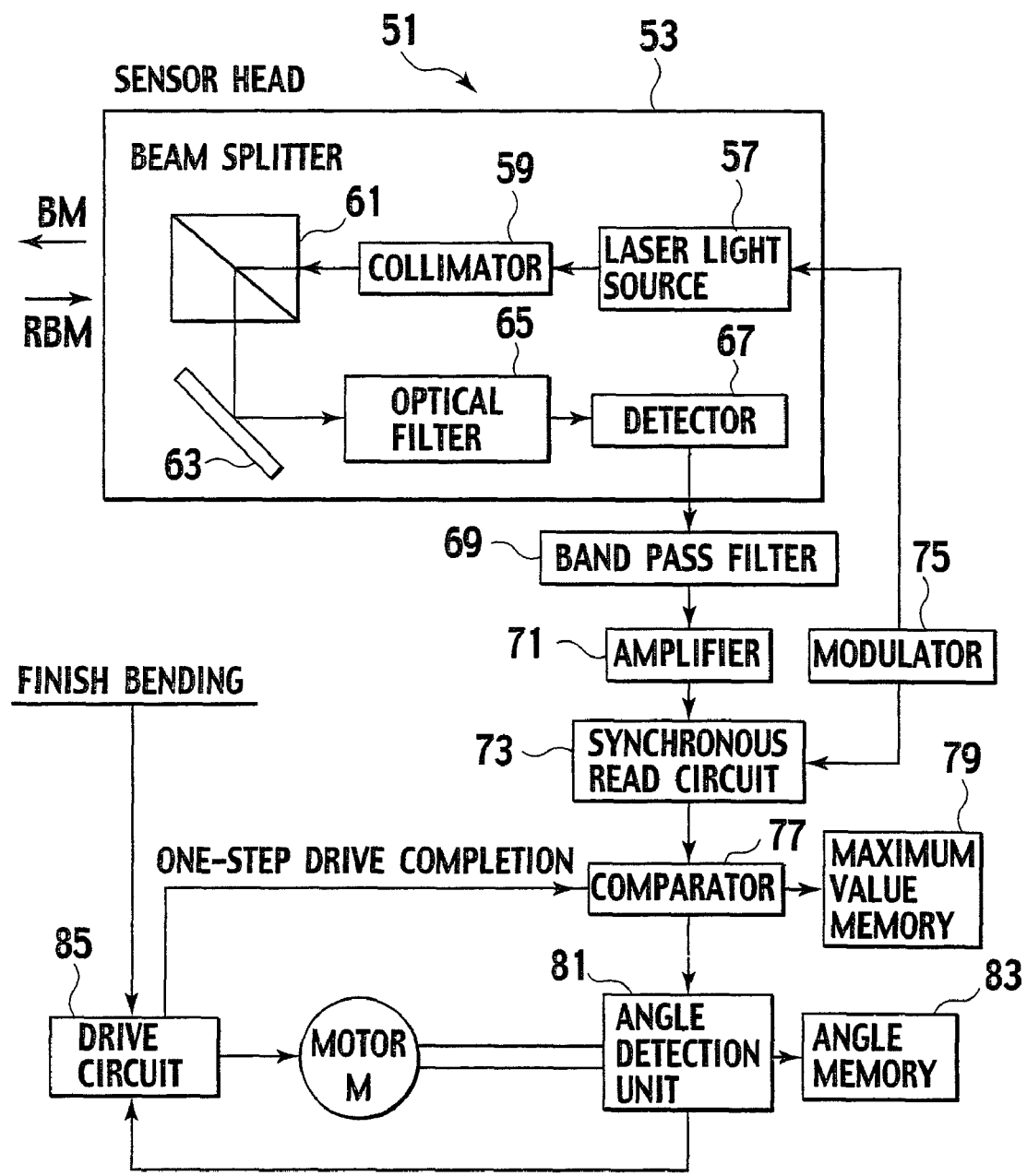
FIG. 14 is a block diagram showing an angle detecting device for a folding machine.

Additionally referring to FIG. 14, in the sensor head 53, the laser beam BM emitted from a light source 57 is collimated by a collimator 59 and transmitted through a beam splitter 61 as a detection beam onto the workpiece W as an object to be detected.

On the other hand, a reflected beam RBM reflected on the workpiece W is bent by the beam splitter 61 and further bent by a reflector 63. From the reflected beam RBM, only a predetermined range of light is separated by an optical filter 65 and a detector 67 as an optical sensor such as a photodiode and converted into an electrical signal to be sent as the light reception signal.

From the thus-obtained light reception signal, signals with a predetermined band of frequencies are passed through a bandpass filter 69. The light reception signal is amplified by an amplifier 71 and inputted into a synchronous read circuit 73, in which the light reception signal is synchronized with a signal of projection of the laser beam BM from the light source 57, the signal being transmitted through a modulator 75.

The light reception signal synchronized with the projection of the laser beam BM by the synchronous read circuit 73 are transmitted to a comparator 77, and a maximum light reception signal is selected and stored in a maximum value memory 59 as a maximum received light amount detecting unit. Moreover, the light reception signal is transmitted to a rotation angle detection unit 81 such as an encoder, which is provided for a servo motor M to rotate the sensor head 53, and at this time, the rotation angle of the sensor head 53 is detected and stored in an angle memory 83 serving as the maximum received light amount detecting unit and also as an angle calculating unit.

Specifically, upon receiving a signal indicating that bending is completed from a controller controlling the press brake, a drive circuit 85 controls the motor M to rotate the sensor head 53 by a predetermined rotation angle for one-step drive and simultaneously sends the one-step drive completion signal to the comparator 77. A current light reception signal is compared with a previous current light reception signal in synchronization with the rotation angle of the sensor head 53, and the maximum light reception signal is stored in the maximum value memory 79 while the rotation angle of the sensor head 53 is stored in the angle memory 83.

Figure 17:
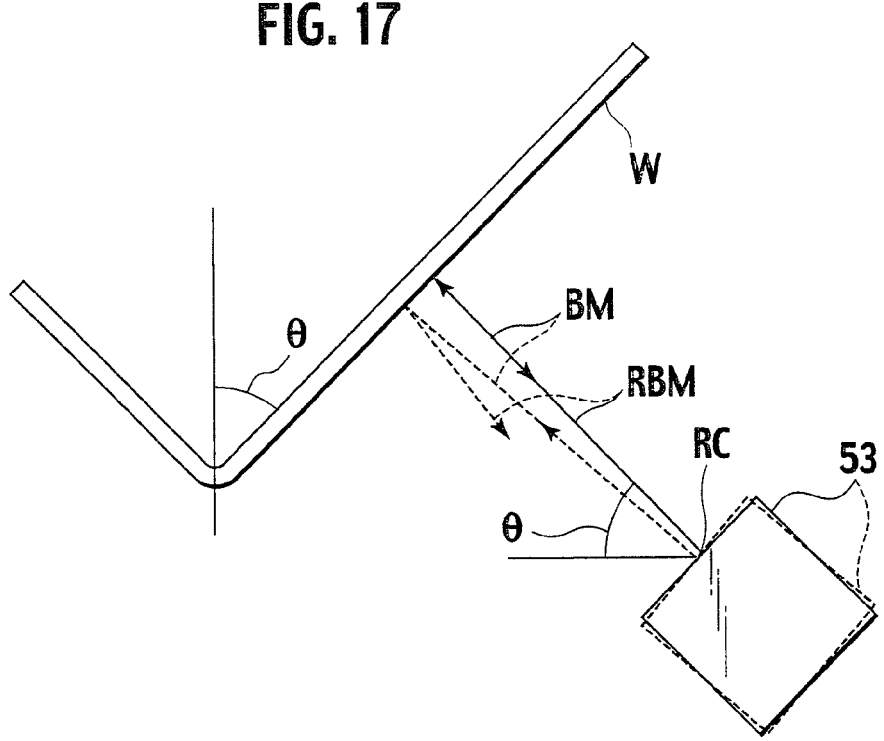
FIG. 17 is an explanatory view showing principles of the angle detecting method and angle detecting device for a folding machine.

Next, a description is given of a principle of detecting the bending angle $2\cdot\theta$ of the workpiece W with reference to FIG. 17.

When the laser beam BM as the detection beam is applied to the workpiece W completely bent from the sensor head 53, the amount of reflected light received by the sensor head 53 varies according to the angle of incidence to the surface of the workpiece W. Accordingly, after the workpiece W is completely bent, the laser beam BM is applied as the sensor head 53 rotates in a range of ±α (herein, α can be 5 to 10 degrees, for example) for the target bending angle 2·θ to calculate a distribution of the amount of light received by the sensor head 53.

Referring to FIG. 17, it is apparent that when the laser beam BM is projected from the sensor head 53 onto the surface of the workpiece W at right angles, the reflected beam RBM follows the same route to be received by the sensor head 53.

Figure 18:
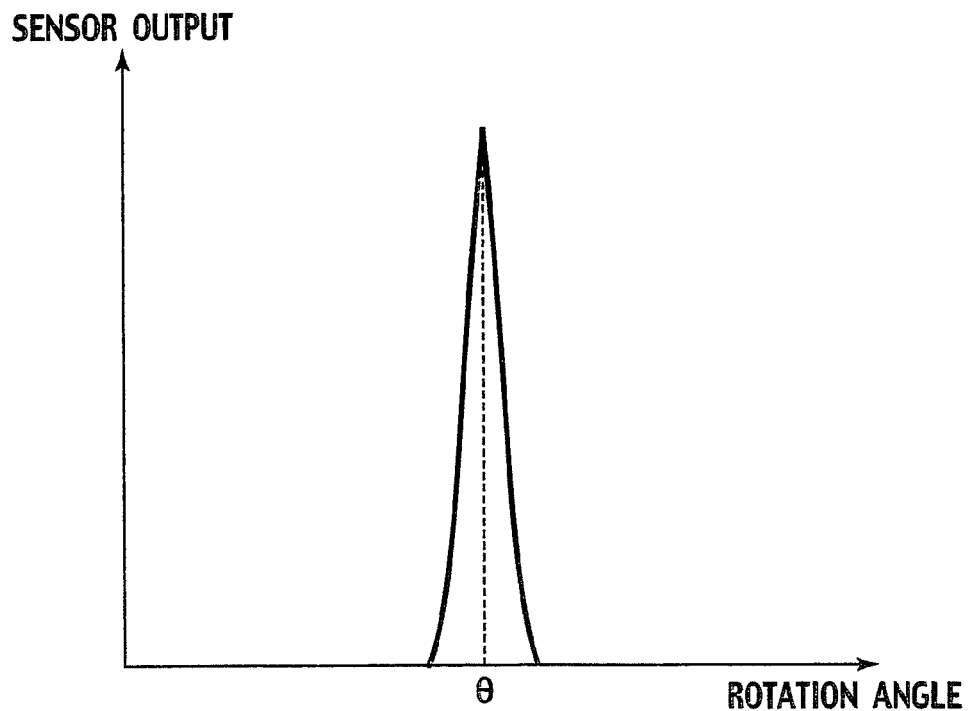
FIG. 18 is a graph showing a change in an amount of light received with respect to a rotation angle of the sensor head.

Additionally referring to FIG. 18, in the distribution of the amount of received light calculated as described above, since the maximum peak is obtained when the laser beam BM is projected onto the workpiece W at right angles, the rotation angle of the sensor head 53 corresponding to the maximum peak is obtained, and on the basis of the obtained rotation angle, the bending angle θ of the workpiece W is detected. Herein, it is obvious that the bending angle is twice θ.

Figure 15:
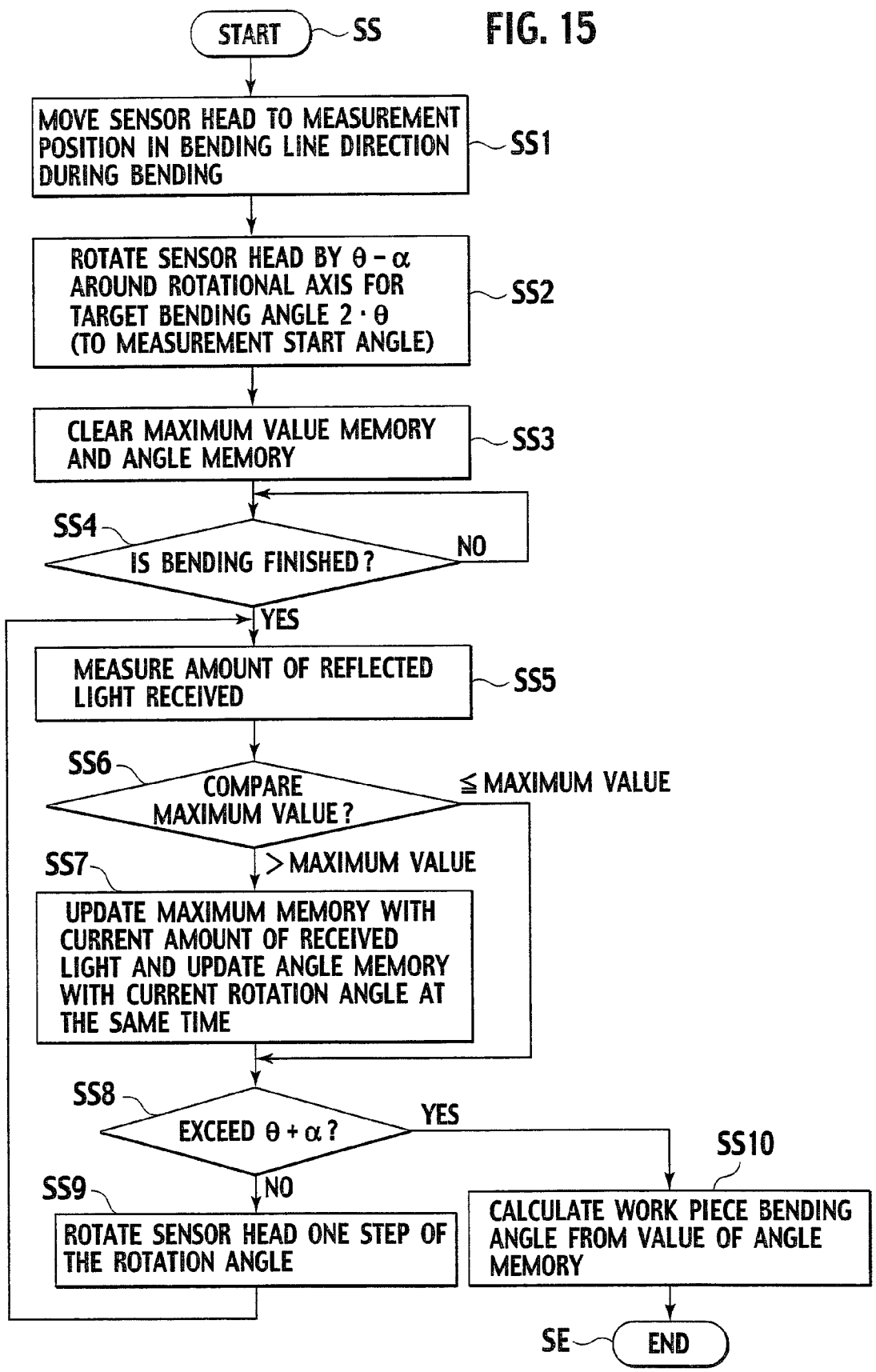
FIG. 15 is a flowchart showing a procedure of an angle detecting method for a folding machine.

Next, on the basis of FIG. 15, a description is given of a procedure of a method of calculating a bending-up angle of the workpiece W using the aforementioned angle detecting device 51 for a folding machine.

When the angle detecting operation starts (step SS), the sensor head 53 is moved to the measuring position in parallel to the bending line during the bending operation (step SS1). The sensor head 53 is then rotated by the motor M around the rotation axis by θ−α for the target bending angle 2·θ to prepare for starting measurement (step SS2). Moreover, the maximum value memory 79 and angle memory 83 are cleared to 0 (step SS3).

It is judged whether bending is finished (step SS4). When the bending is finished, the procedure proceeds to measurement. The reflected beam RBM of the laser beam BM projected from the sensor head 53 to the workpiece W is received, and the amount of received light is measured (step SS5). The measured amount of received light is compared with the current maximum value (step SS6). When the measured amount of received light is larger than the current maximum value, the maximum value memory 79 is updated with the amount of received light currently detected, and simultaneously the angle memory 83 is updated with the current rotation angle of the sensor head 53 (step SS7).

On the other hand, in the step SS6, when the measured amount of received light is not larger than the current maximum value and after the maximum value is updated in the step SS7, it is judged whether the rotation angle of the sensor head 53 is θ+α (step SS8). When the rotation angle is smaller than θ+α, the sensor head 53 is rotated one step. The procedure then returns to the step SS5, and the subsequent steps are repeated (step SS9).

When the rotation angle of the sensor head 53 reaches θ+α, the bending angle 2·θ of the workpiece W is calculated from the rotation angle stored in the angle memory 83 (step SS10), and the angle detecting operation is terminated (step SE).

In the aforementioned embodiment, the sensor head 53 is provided on a die base (die holder) 55 so as to move in the direction of the bending line and rotate but can be attached to a bed of the press brake so as to move up, down, forward, and backward. This makes it possible to measure bending angle in a wider range.

There is another method in which all the measured values are stored, and after the measurement, a series of measured data is subjected to curve fitting; and an angle which provides the maximum amount of received light is calculated from the fitted curve. This method enables angle measurement with accuracy not more than the measured rotation angle of the sensor head 53. In this description, the measurement is conducted in a pressed state by the punch a die, but the state at the measurement is not limited to this.

The case where the workpiece has a small reflectivity because of the condition of the surface thereof can be easily dealt with by proper treatment, for example, such as application of proper reflective tape. The angle measurement can be implemented without the effects by the surface condition of the workpiece.

The present invention is not limited to the aforementioned embodiments and can be implemented in another mode by making a proper modification. For example, the bending angle detecting device can be constituted using a transmitter transmitting proper electromagnetic or ultrasonic waves and a receiver corresponding thereto instead of the optical transmitter and receivers.

In such a case, in the constitution of FIGS. 8 and 14, the constitution concerning the optical system is replaced with a constitution which suits for the electromagnetic or ultrasonic waves. The angle detecting device includes: an angle sensor; a rotation angle detecting unit; a peak value detecting unit; and an angle calculating unit. The angle sensor includes: a transmission source transmitting a detection wave to a measurement object; and a plurality of sensors which are opposed to each other with the transmission source interposed therebetween and which receive waves reflected on the measurement object. The angle sensor is also rotatable in positive and negative directions in a plane where the transmission source and sensors are arranged. The rotation angle detecting unit detects a rotation angle of the angle sensor with respect to a predetermined reference position. The peak value detecting unit detects a peak value of the reflected waves received by the optical sensors. The angle calculating unit calculates the angle of the measurement object on the basis of the rotation angle of the angle sensor which is detected by the rotation angle detecting unit and which corresponds to the peak value detected by the peak value detecting unit.

Moreover, the angle detecting device includes: an angle sensor; a rotation angle detecting unit; and an angle calculating unit. The angle sensor includes: a transmission source transmitting detection waves to a measurement object; and at least a pair of sensors which are provided on symmetric positions with respect to the transmission source and which receive the waves reflected on the measurement object. The angle sensor is also rotatable in positive and negative directions in a plane where the transmission source and sensors are arranged. The rotation angle detecting unit detects a rotation angle of the angle sensor with respect to a predetermined reference position. The angle calculating unit calculates the angle of the measurement object on the basis of the rotation angle of the angle sensor which is detected by the rotation angle detecting unit where the reflected waves received by the pair of sensors have equal intensity.

Furthermore, the angle detecting device includes: an angle sensor; a rotation angle detecting unit; a peak value detecting unit; an angle detecting unit; and an angle calculating unit. The angle sensor includes: a transmission source transmitting detection waves to a measurement object; and a sensor which receives the waves reflected on the measurement object. The angle sensor is also rotatable around a rotation axis parallel to the bending line of the measurement object. The rotation angle detecting unit detects a rotation angle of the angle sensor with respect to a predetermined reference position. The peak value detecting unit detects a peak value of the reflected waves received by the sensor. The angle detecting unit detects the rotation angle of the angle sensor where the peak value is obtained by the peak value detecting unit. The angle calculating unit calculates the angle of the measurement object on the basis of the rotation angle obtained by the angle detecting unit.

The angle sensor includes: a transmission source for projecting detection waves to a measurement object; and sensors which receive the waves reflected on the measurement object, in which the sensors are opposed to each other with the transmission source interposed therebetween.

In each embodiment, the description is given of the case where the bending angle of the workpiece is detected with the casing of the detector fixed in contact with the lower tool. However, the bending angle of the workpiece may be detected by fixing the casing of the detector in contact with the upper tool.

Figure 19:
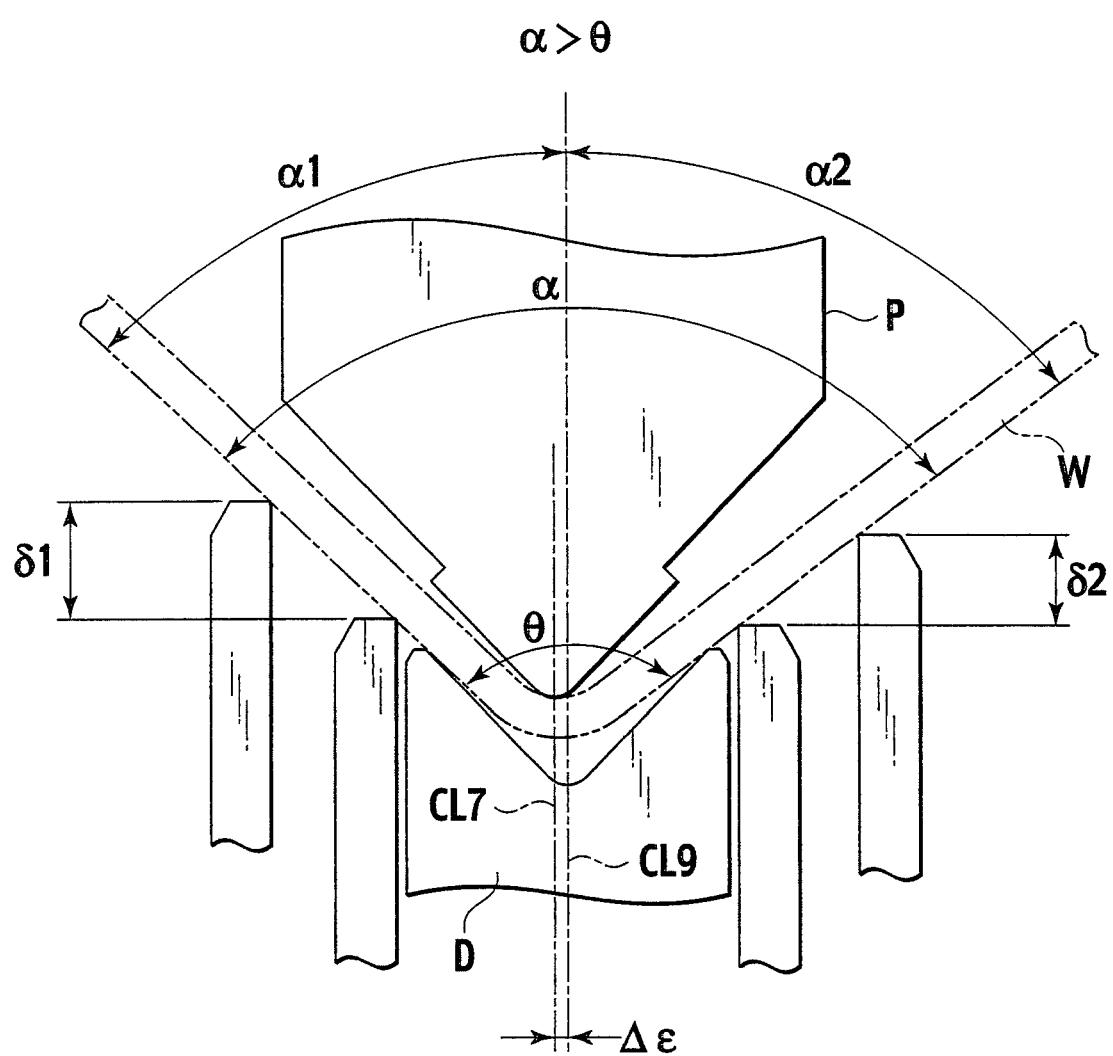
FIG. 19 is a view showing a workpiece W bent.

As shown in FIG. 19 (a view showing the workpiece W bent), in the case where a center CL7 of the die D is slightly displaced from a center CL9 of the punch P (displaced by a difference $\Delta\epsilon$) and the bending angle $\alpha$ of the workpiece W is larger than an angle $\theta$ of the V-shaped groove of the die D, bending is performed with the difference $\Delta\epsilon$ substantially maintained. Accordingly, a bending angle $\alpha 1$ on a side of the workpiece W with respect to the center line CL9 of the die D is not equal to a bending angle $\alpha 2$ on the other side of the workpiece W with respect to the center line CL9 of the die D, and the difference between the bending angles $\alpha 1$ and $\alpha 2$ becomes large.

Accordingly, in order to accurately measure the bending angle of the workpiece W, instead of measuring the bending angle $\alpha 1$ on one side by means of the bending angle detecting device (bending angle measuring device) 102 provided on one side of the die D and doubling the measured value, it is necessary to individually measure the angles $\alpha 1$ and $\alpha 2$ on both sides (for example, measure $\delta 1$ and $\delta 2$ in FIG. 19) by means of the bending angle detecting device 102 on each side of the die D (each side in the Y-axis direction) and calculating the sum of the angles $\alpha 1$ and $\alpha 2$ to obtain the bending angle $\alpha$ of the workpiece W.

Figure 20:
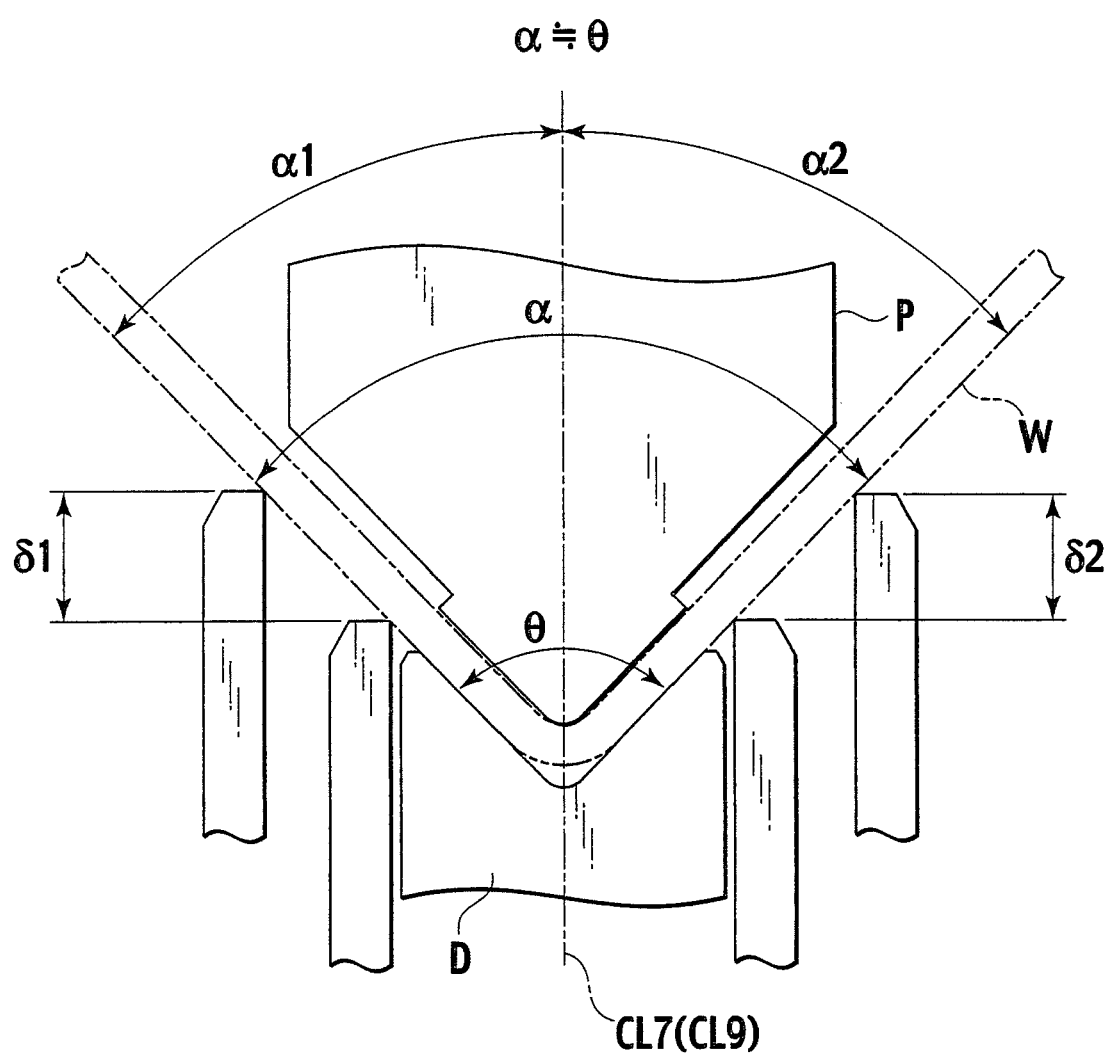
FIG. 20 is a view showing the workpiece W bent.

On the other hand, even in the case where the center CL7 of the die D is slightly displaced from the center CL9 of the punch P, as shown in FIG. 20, when the bending angle $\alpha$ of the workpiece W is close to the angle $\theta$ of the V-shaped groove of the die D (when the angles $\theta$ and $\alpha$ are substantially equal to each other), the difference $\Delta\epsilon$ is almost eliminated since the punch P fits to the die D with pressure to bend the workpiece W. Accordingly, the bending angle of the workpiece W may be obtained by detecting only the bending angle $\alpha 1$ by means of the bending angle detecting device 102 provided on one side of the die D and doubling the detected angle $\alpha 1$.

Figure 21:
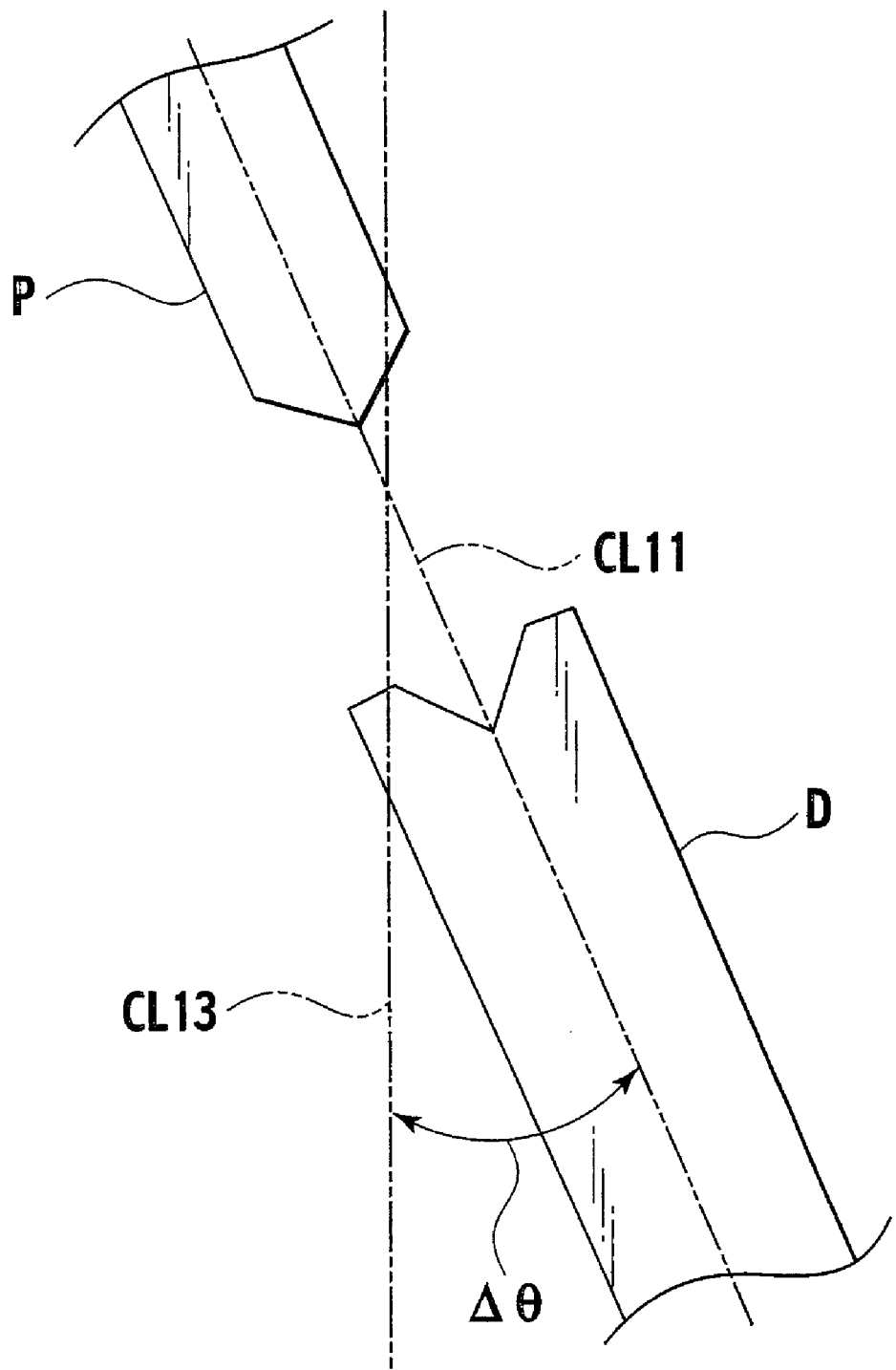
FIG. 21 is a view showing a state where the central axis of the die and punch is displaced from a vertical axis by a small angle.

According to the bending angle detecting device 102, the bending angle of the workpiece W is measured with the casing 109 in contact with the die D. Accordingly, as shown in FIG. 21, even if a central axis CL11 of the die D and punch P is displaced from a vertical axis CL13 by a slight angle $\Delta\theta$, the bending angle detecting device 102 can accurately measure the bending angle of the workpiece W by measuring only the bending angle on one side of the die D, which is different from the workpiece bending machine of the Patent Literature 1 (Japanese Patent Application Laid-open Publication No. 2001-121215).

[Workpiece Bending Machine]

Herein, a description is given of a workpiece bending machine 101 including a workpiece bending angle detecting device 102. However, the workpiece bending machine 101 does not necessarily include a machine similar to the workpiece bending detecting device 102 and may include a bending angle detecting device of another constitution, for example, a workpiece bending angle detecting device as shown in the Patent Literature 1 (Japanese Patent Application Laid-open Publication No. 2001-121215).

Figure 23:
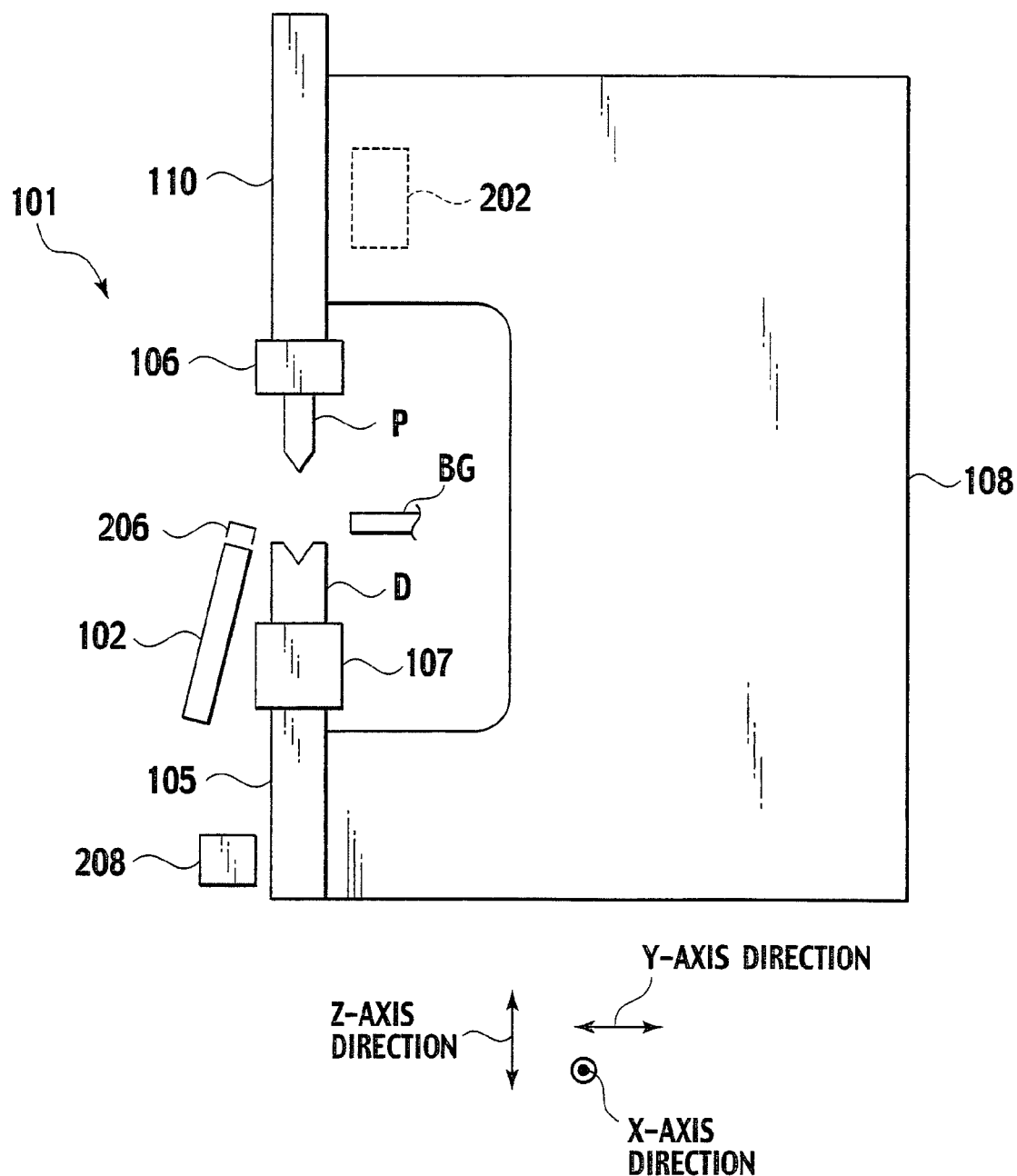
FIG. 23 is a side view showing a schematic structure of the workpiece bending machine.

The workpiece bending machine 101 is configured as previously described (see FIGS. 22 and 23) and configured to perform so-called step bend by including a plurality of pairs of tools set. Moreover, the workpiece bending machine 101 further includes backgauges BG, a navigating member 206, and one or a plurality of the workpiece bending angle detecting devices (BI) 102, and a footswitch 208.

The backgauges BG are ones against which the operator strikes the workpiece W to position the workpiece W in the Y-axis direction when bending the workpiece W. The navigating member 206 is one against which the operator strikes the workpiece W to position the workpiece W in the x-axis direction when bending the workpiece W. The footswitch 208 is a switch to activate the ram of the workpiece bending machine 101.

Herein, for facilitating the understanding, a "pinching point," a "DV value," a "final finishing DV value (final DV value including the amount of spring back)," and a "DV value in temporary bending" are described.

The "pinching point" is a state where the workpiece W begins to be sandwiched between the die D and punch P. In this state, the workpiece W is a little deformed yet but substantially fixed by the die D and punch P because the die D and punch P sandwiches the workpiece W to apply slight force to the workpiece W.

The "DV value" is a distance between the deepest part of the V-shaped groove of the die and the tip of the punch P. The DV value therefore changes according to changes in the distance between the punch P and die D during bending of the workpiece W.

The "final finishing DV value including the amount of spring back (final DV value)" is a DV value required to bend the workpiece W 89 degrees when the amount of spring back of the workpiece W is 1 degree for manufacturing a product with a folding angle of 90 degrees.

The "DV value of temporary bending" is a DV value when the bending angle of the workpiece W is a little larger than the bending angle for the final DV value. For example, when the final DV value for manufacturing the product with a folding angle of 90 degrees is a DV value required to bend the workpiece W 89 degrees, the DV value of temporary bending is a DV value required to bend the workpiece W 91 degrees.

Figure 26:
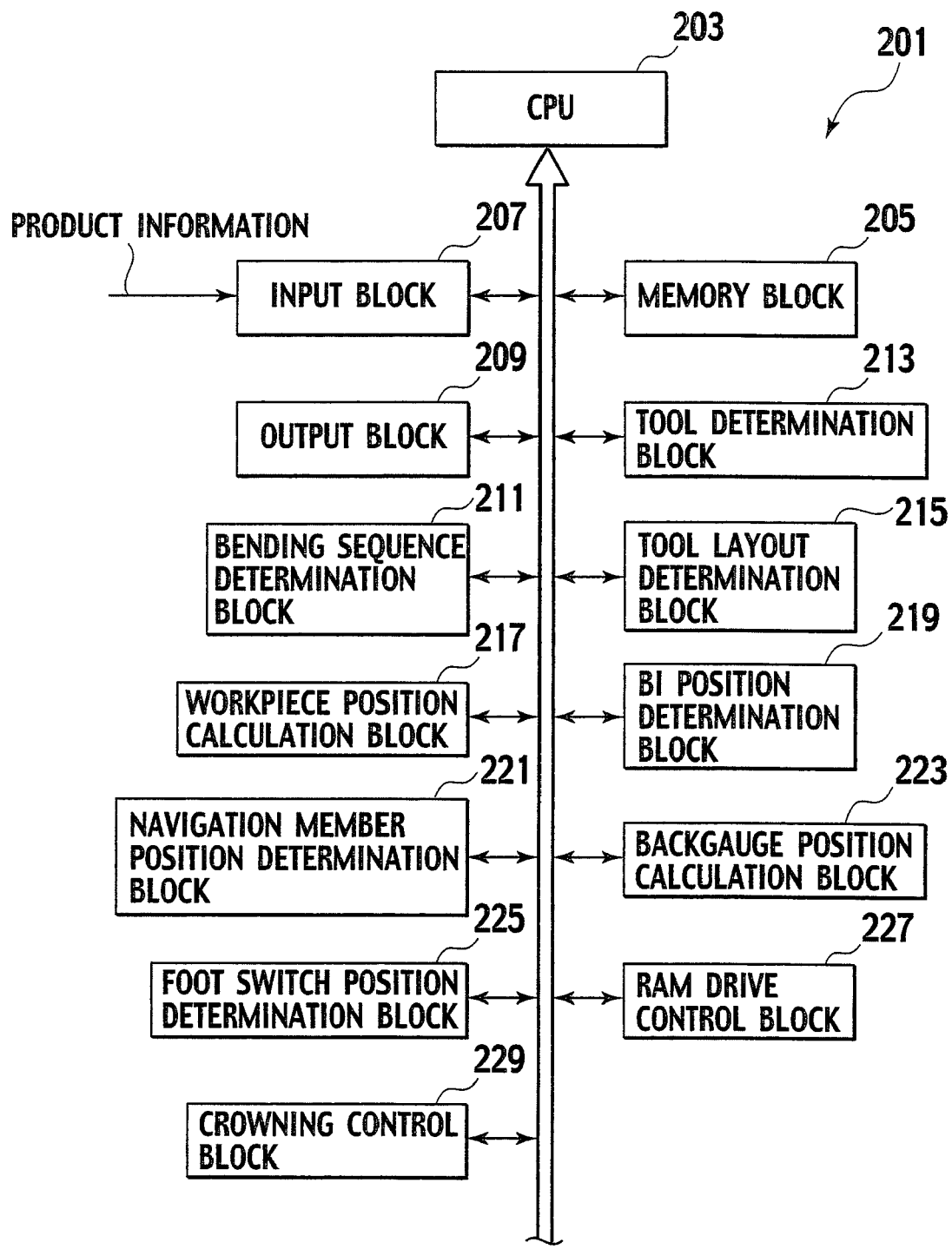
FIG. 26 is a block diagram showing a schematic configuration of a controller.

The workpiece bending machine 101 further includes, for example, a controller 201 shown in FIG. 26. The controller 201 includes a CPU 203, a memory unit (memory block) 205, an input unit (input block) 207, an output unit (output block) 209, a bending sequence determination unit (bending sequence determination block) 211, a tool determination unit (tool determination block) 213, a tool layout determination unit (tool layout determination block) 215, a workpiece position calculation unit (workpiece position calculation block) 217, an angle detecting position determination unit (BI position determination block) 219, a navigating member position determination unit (navigation position determination block) 221, a backgauge position calculation unit (backgauge position calculation block) 223, a footswitch position determination unit (footswitch position determination block) 225, a ram drive control unit (ram drive control block) 227, and a crowning control unit (crowning control block) 229.

The controller 201 further includes a final DV value calculation unit, a backgauge driving positioning unit, an angle detecting device driving positioning unit, and the like (not shown).

The input block 207 receives information (product information) about the form of a product manufactured from the workpiece W through a network or using a storage medium such as a CD. The output block 209 includes a display unit composed of a LCD and the like. The memory block 205 stores information necessary for operations of an operation program of the CPU 203 and the controller 201.

The bending sequence determination block 211 determines a bending sequence of the workpiece W on the basis of the product information received by the input block 207. The tool determination block 213 determines a tool (one or a plurality of tools; normally, a plurality of tools) used for bending of the workpiece W on the basis of the product information.

The tool layout determination block 215 determines a layout of tools used for bending of the workpiece W on the basis of the product information. The workpiece position calculation block 217 calculates, as workpiece position information, the position of the workpiece W with respect to the positions of tools determined by the tool layout determination block 251 for each step of the bending sequence of the workpiece W determined by the bending sequence determination block 211.

The final DV value calculation unit calculates, on the basis of the product information, the final DV value for each step of the bending sequence of the workpiece W determined by the bending sequence determination block 211. The backgauge position calculation block 233 calculates, on the basis of the product information, the position of the backgauge BG for each step of the bending sequence of the workpiece W determined by the bending sequence determination block 211 as backgauge position information.

The backgauge driving positioning unit drives and positions the backgauge BG with an actuator such as a servo motor to a predetermined position on the basis of the backgauge position information calculated by the backgauge position calculation block 223. The BI position determination block 219 determines the position (the detection position of the bending angle of the workpiece W in the direction that the bending line of the workpiece W extends) of each workpiece bending angle detecting device (BI; bending indicator) 102, which detects the bending angle of the workpiece W during bending of the workpiece W, for each step of the bending sequence of the workpiece W determined by the bending sequence determination block 211.

The angle detecting device driving positioning unit drives and positions each workpiece bending angle detecting device 102 with an actuator such as a servo motor on the basis of the detection position information determined by the BI position determination block 219.

The work bending machine 101 includes a plurality of the workpiece bending angle detecting devices 102, which can be independently moved and positioned in the x-axis direction by means of respective actuators such as servo motors individually provided for the workpiece bending angle detecting devices 102.

The BI position determination block 219 determines the number and positions of the used workpiece bending angle detecting device 102 for each step of the bending sequence of the workpiece W determined by the bending sequence determination unit 211 on the basis of the product information.

For example, the BI position determination block 219 arranges the work bending angle detecting devices 102 so that: the bending angle of the workpiece W is measured at three positions of both the ends and center of the workpiece W in the x-axis direction (by three workpiece bending angle detecting devices 102) when the length of the workpiece W in the x-axis direction is longer than a predetermined value $Ax$; the bending angle of the workpiece W is also measured at two positions of both the ends of the workpiece W in the x-axis direction (by two workpiece bending angle detecting devices 102) when the length of the workpiece W in the x-axis direction is not longer than a predetermined value $Ax$ and longer than a predetermined value $Bx$ (which is shorter than the above value $Ax$); and the bending angle of the workpiece W is further measured at a position when the length of the workpiece W in the x-axis direction is not longer than the predetermined value $Bx$. Furthermore, when a formed object such as a hole is at the measurement position of the bending angle of the workpiece W and prevents measurement of the bending angle, the BI position determination block 219 corrects the measurement position.

The ram drive control block 227 of the controller 201 controls the actuator 202, which drives the ram, under the control of the CPU 203 on the basis of the final DV value calculated by the final DV value calculation unit for each step of the bending sequence of the workpiece W determined by the bending sequence determination block 211.

A navigating member 206 constituting the navigating unit, whose detailed description is omitted, is configured in a similar manner to that used in a navigating mechanism of a bending machine described in a fourth embodiment of Japanese Patent Application Laid-open Publication No. 2004-160547. The navigating member 206 guides the operator to the position of the workpiece W in the direction that the bending line of the workpiece W extends for each step of the bending sequence of the workpiece W determined by the bending sequence determination unit 211.

Such a constitution allows the operator to easily know with which bending station (tool) the operator should perform next bending for the workpiece W.

The navigating member 206 is, for example, engaged with a rail 133 of the second moving unit 113 and allowed to be freely moved and positioned by an actuator such as a servo motor separately from the workpiece bending angle detecting device 102 under the control of the controller 201.

Moreover, instead of the navigating member, ones described in first to third embodiments of Japanese Patent Application Laid-open Publication No. 2004-160547 may be employed as the navigating unit.

The workpiece bending machine 101 is provided with the footswitch 208, for example, similar to a footswitch described in Japanese Patent Application Laid-open Publication No. 2005-319515. The footswitch 208 is guided by a linear bearing or the like, driven by an actuator such as a servo motor, and allowed to be freely moved and positioned in the direction of the bending line of the workpiece W extends (x-axis direction). The footswitch 208 is moved and positioned for each step of the bending sequence of the workpiece W determined by the bending sequence determination block 211 on the basis of the position of the workpiece W calculated by the workpiece position calculation block 217.

Figure 31:
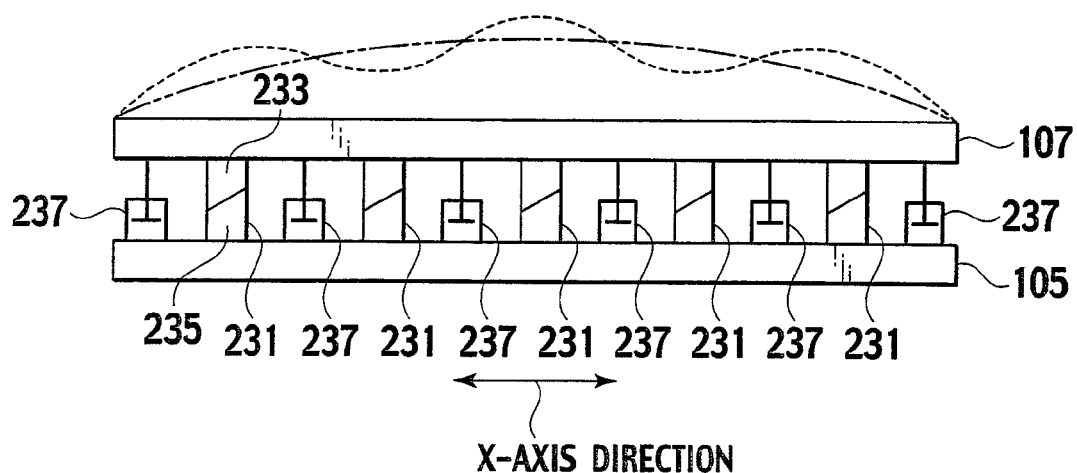
FIGS. 31A and 31B are views showing a crowning unit.
Figure 31:
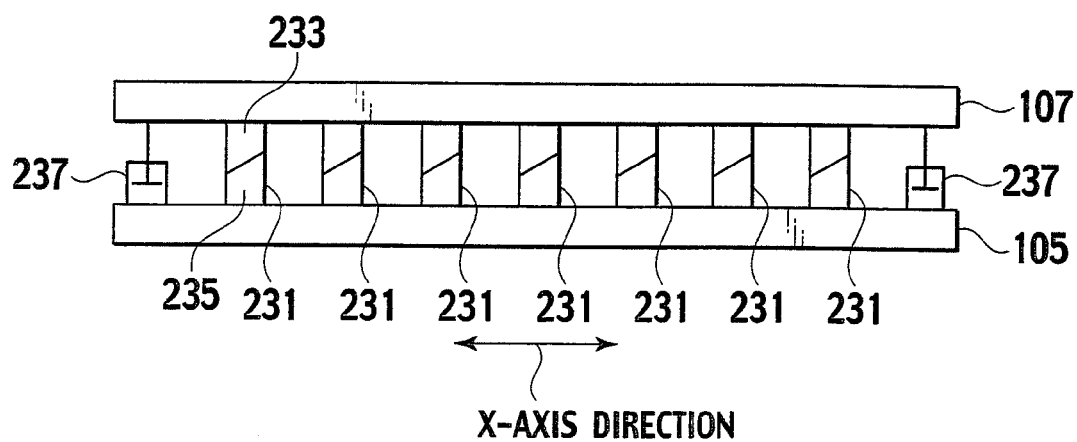

Furthermore, the workpiece bending machine 101 is provided with a plurality of crowning units 231 similar to, for example, a crowning device described in Japanese Patent Application Laid-open Publication No. 2005-230882 are aligned in the direction that the bending line of the workpiece W extends at a small pitch (for example, a pitch allowing at least two crowning units 231 to act on each of the laid out tools; such a pitch that at least two crowning units 231 are located in a longitudinal size of each laid out tool) (see FIGS. 31A and 31B). In the workpiece bending machine 101, the crowning units 231 are provided between the lower table 105 and die holder 107 but may be provided between the upper table 110 and punch holder 106 or for both the upper and lower tables 110 and 105.

Briefly describing the crowning units 231 with reference to FIG. 31(A), each of the crowning units 231 includes a first member 233 integrally provided for the lower tool holder 107 and a second member 235 which is engaged with the first member 233 and is freely rotated relative to the first member 233 and lower table 105 by means of an actuator such as a servo motor.

The members 233 and 235 are composed of a rotational wedge mechanism as shown in FIG. 3 of Japanese Patent Application Laid-open Publication No. 2005-230882. The rotational wedge mechanism is constituted by providing the first member 233 including an inclined joint surface on the second member 235 including a corresponding inclined joint surface (brought into contact with the joint surface of the first member 233).

As shown in FIG. 31(A), between the adjacent crowning units 231 in the x-axis direction, a fluid pressure cylinder 237 is provided. By driving the fluid pressure cylinders 237, the lower tool holder 107 moves close to or apart from the lower table 105.

Under control of the crowning control block 229 of the controller 201, the lower tool holder 107 is moved upward by means of the fluid pressure cylinder 237, and then the first members 233 are rotated and positioned to individually set the crowning units 231 at proper heights. Thereafter, when the lower tool holder 107 is moved downward by means of the fluid pressure cylinders 237, as indicated by a dashed line and a dashed double dotted line in FIG. 31A, the lower holder (die D) 107 is a little deformed for proper crowning. At this time, it is desirable that the magnitude of force of each fluid pressure cylinder 237 moving the lower tool holder 107 downward can be individually controlled.

As shown in FIG. 31(B), the fluid pressure cylinders 237 may be provided at both ends of the crowning units 231 and moreover, may be properly provided between some of pairs of adjacent crowning units 231.

Next, a description is given of an operation of the workpiece bending machine 101.

In the workpiece bending machine 101, as described above or as shown in FIG. 22, so-called step bend sequentially performing bending for the workpiece W (for example, sequentially performing bending from left to right in FIG. 22) is conducted with the plurality of tools PD installed in the x-axis direction.

Figure 24:
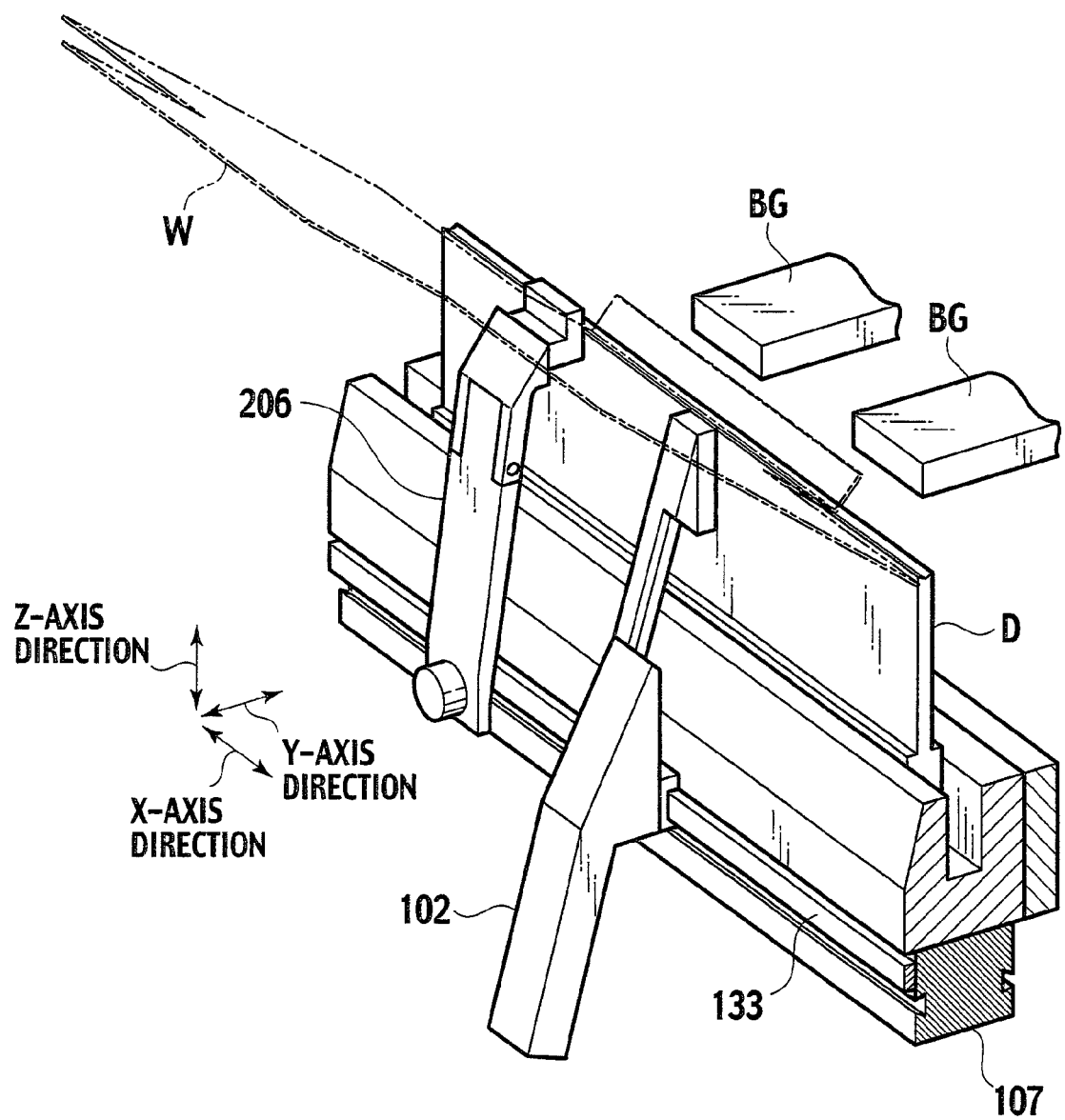
FIG. 24 is a perspective view showing a positional relation between the die, the workpiece, backgauges, a navigating member, and the workpiece bending angle detecting device.
Figure 29:
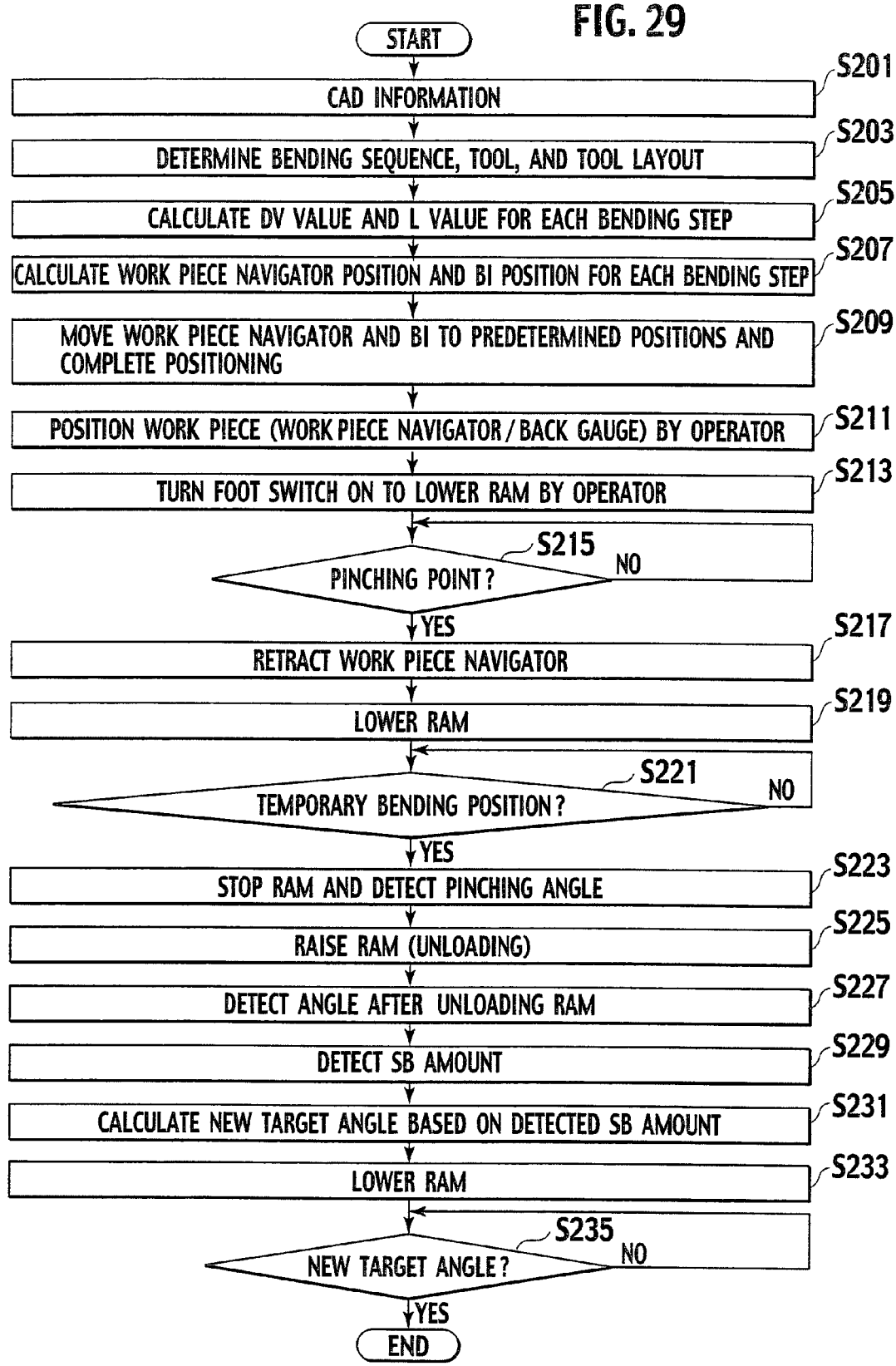
FIG. 29 is a flowchart showing an operation of the workpiece bending machine.

First, with reference to FIG. 29 a description is given of a case of performing bending for the workpiece W having comparatively large size in the x-axis direction as shown in FIG. 24.

Figure 28:
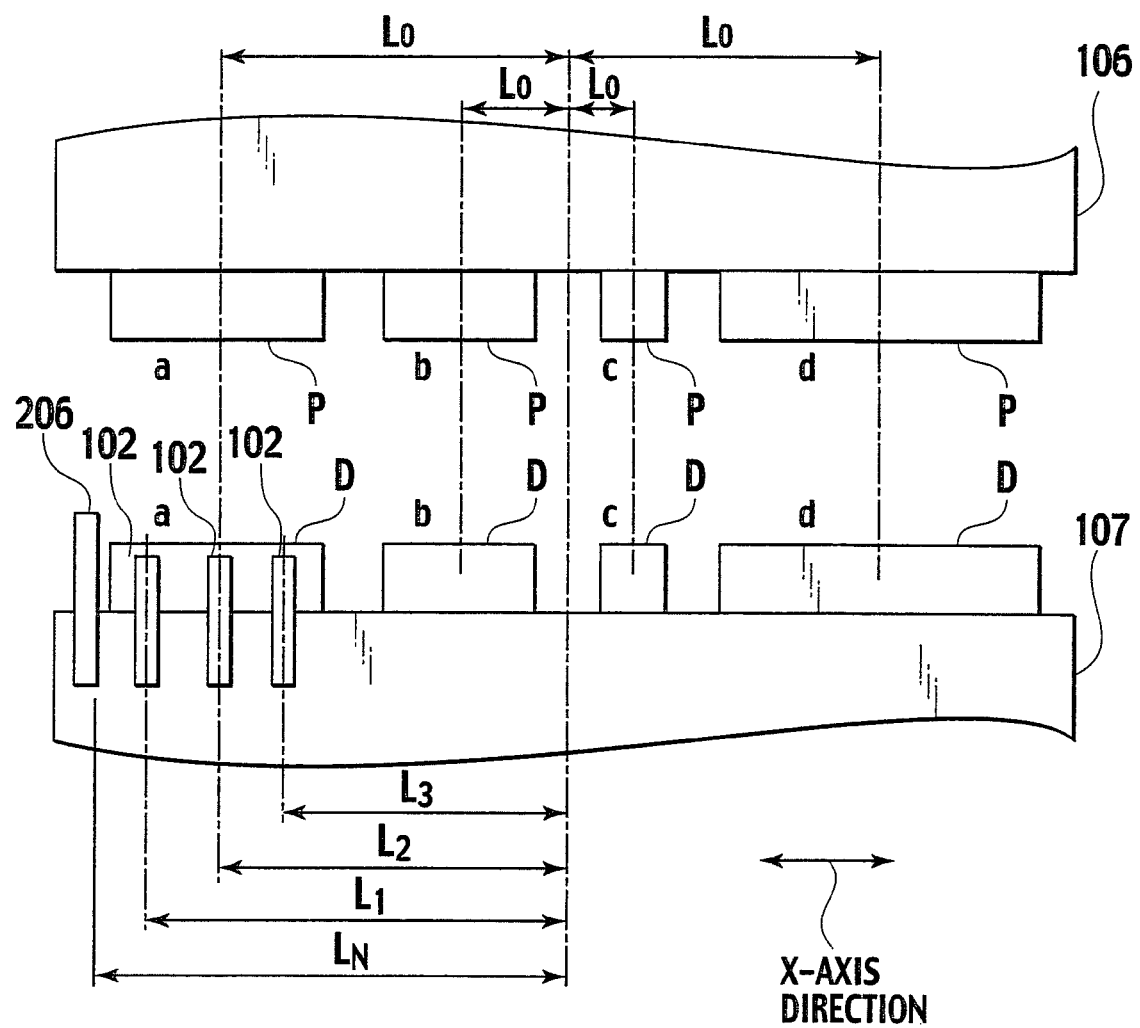
FIG. 28 is a perspective view showing a positional relation between each tool in a tool layout, the navigating member, and the workpiece bending angle detecting device, the view being viewed in the same direction as that of FIG. 22.

In step S201, the product information is received through the input block 207 from CAD and the like, and in step S203, the bending sequence of the workpiece W, tools used in bending, and the layout of the tools are determined by the bending sequence determination block 211, tool determination block 213, and tool layout determination block 215. According to the determined layout, the operator sets the tools P and D in the bending machine 101 as shown in FIGS. 22 and 28.

Subsequently, in step S205, the DV and L values are calculated for each bending step of the workpiece W (for each step of the bending sequence of the workpiece W) using the CPU 203 and the like. In step S207, the position of the navigating member 206, the number and positions of the workpiece bending angle detecting devices 102, the position of the backgauge BC, and the position of the footswitch 208 are calculated for each bending step of the workpiece W by the workpiece position calculation block 217, navigating member position determination block 221, BI position determination block 219, backgauge position calculation block 223, and footswitch position determination block 225.

These calculated ones are displayed on the display unit of the output block 209 as shown in FIG. 27. The table shown in FIG. 27 displays the bending sequence "1, 2, 3 . . . ," tools used in each step of the bending sequence "a, b, c, . . . ," the position "L0" of each tool as shown in FIG. 28, the positions of the workpiece bending angle detecting devices 102 "L1, L2, L3 . . . ," the final DV value, L value, and the position "LN" of the navigating member 206. In addition to the above display, the position of the backgauge BG, the position of the footswitch 208, and the like may be displayed. For example, in the case of using two backgauges BG, the footswitch 208 is usually positioned in the middle between the two backgauges BG in the x-axis direction.

The operator can select each value shown in FIG. 27 with a touch panel provided for the display unit and correct the same using a "numeric keyboard" or the like. Furthermore, each value shown in FIG. 27 may be inputted by the operator from the beginning instead of being calculated by computing of the controller 201.

Next, in step S209, the navigating member 206, each bending angle detecting device 102, the footswitch 208, and the backgauge BG are moved and positioned for the first bending step. In this state, the detector 103 of each bending angle detecting device 102 is located below the angle detection position of the workpiece W. Subsequently, in step S211, the operator strikes the workpiece W against the backgauge BG and navigating member 206 for loading. The operator operates the footswitch 208 with the workpiece W loaded to lower the ram (S213).

When the ram is lowered to reach the pinching point (S215), the ram is paused, and the navigating member 206 and backgauge are retracted (S217). The ram is further lowered for bending of the working piece W (S219). When the punch reaches the temporary bending position (the DV value of temporary bending) (S221), the ram is stopped, and the detector 103 is moved upward toward the angle detection position of the workpiece W to detect the workpiece bending angle with the workpiece bending angle detecting device 102 (S223).

Subsequently, in step S225, the ram is a little raised, and the load on the workpiece W is removed (unloaded). The bending angle of the workpiece W after unloading is measured by the workpiece bending angle detecting device 102. In step S229, the amount of spring back (SB) of the workpiece W is detected.

Next, on the basis of the detected SB amount, a new target angle (new final DV value; corrected final DV value) of the workpiece W is calculated (S231). The ram is further lowered, and when the ram (punch P) reaches the corrected final DV value (S235), the first bending step is finished. Subsequently, the procedure returns to the step S209, and the second and subsequent bending steps are sequentially executed in the same manner until all the bending steps are finished.

Figure 25:
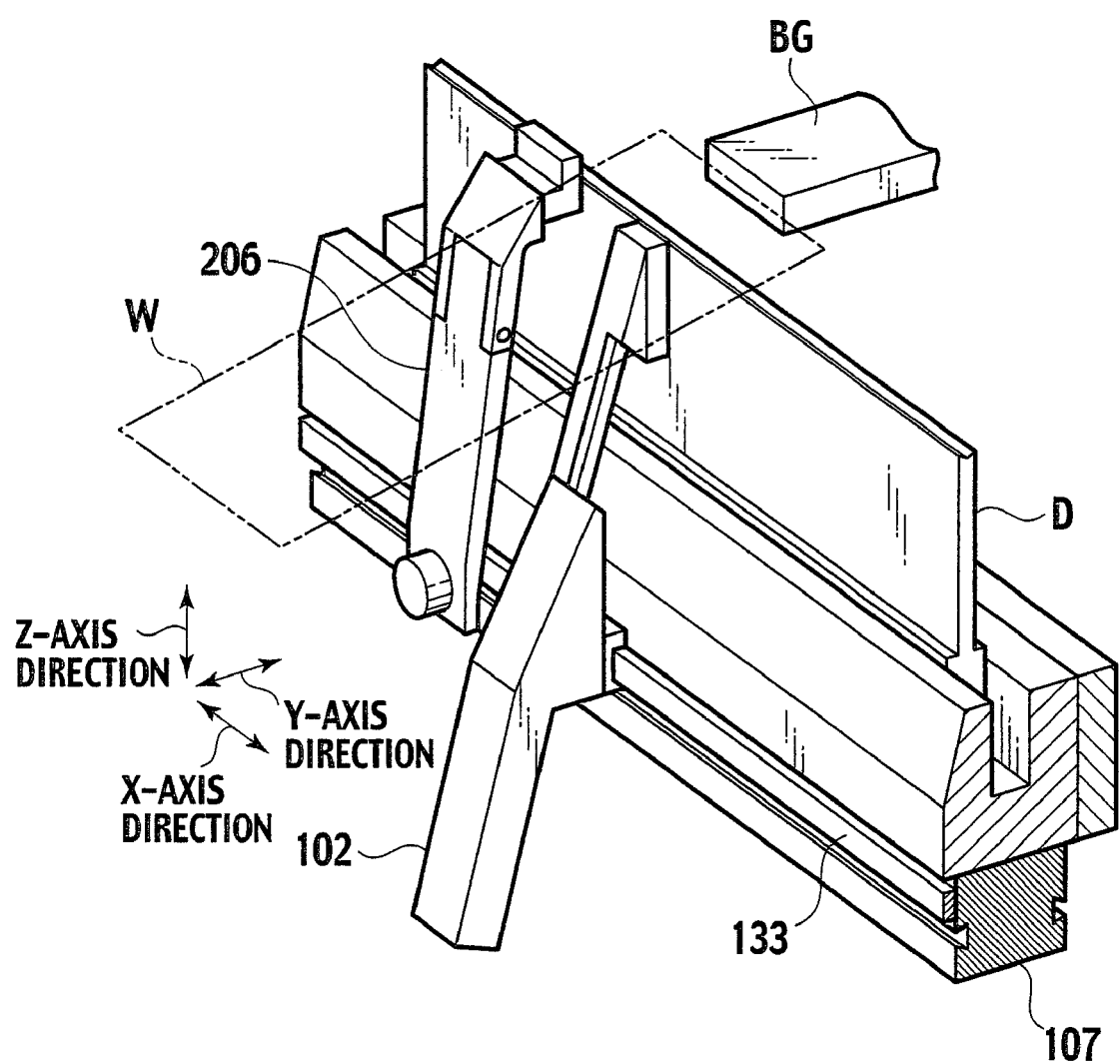
FIG. 25 is a perspective view showing a positional relation between the die, the workpiece, the backgauge, the navigating member, and the workpiece bending angle detecting device.
Figure 30:
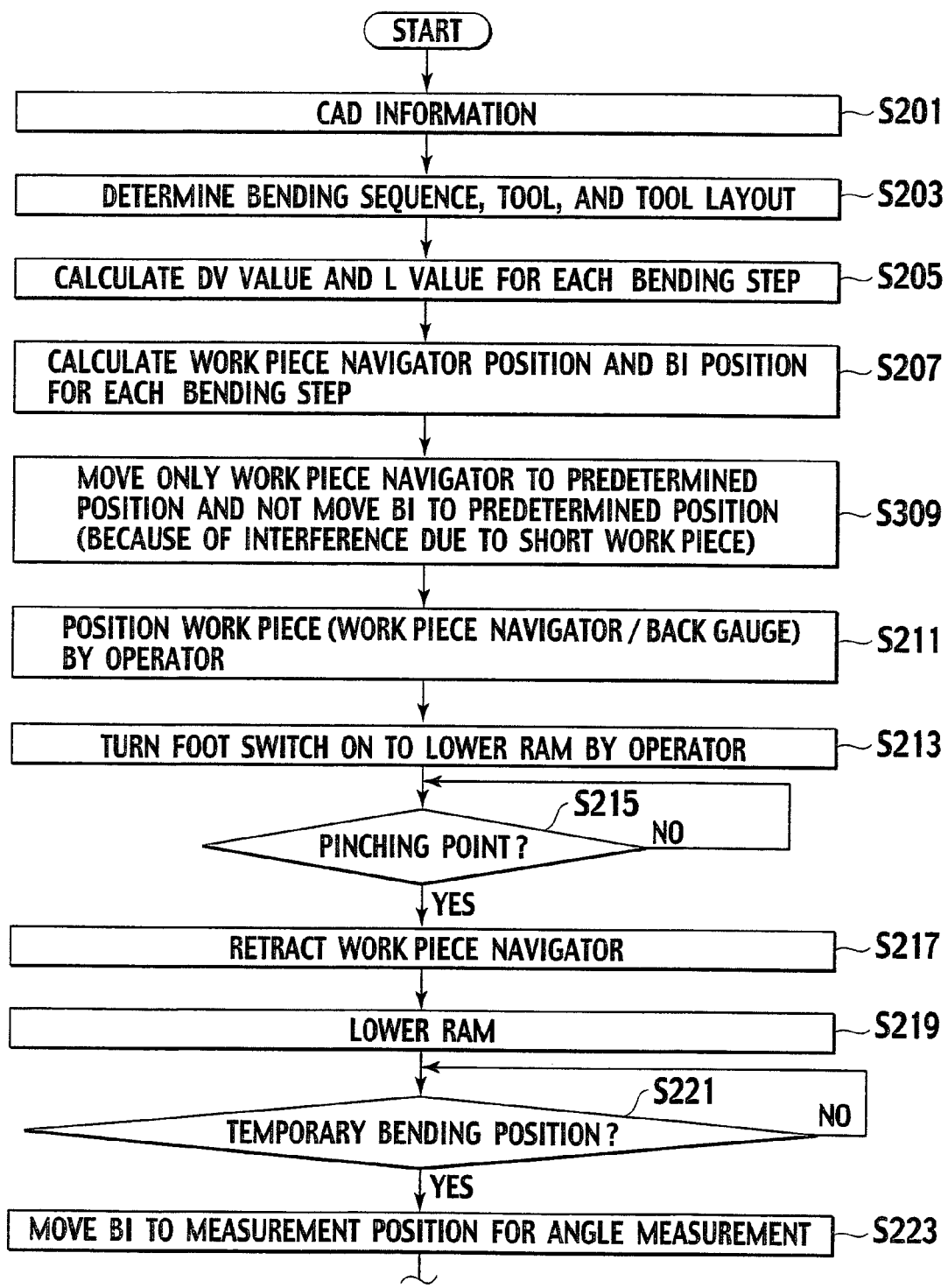
FIG. 30 is a flowchart showing an operation of the workpiece bending machine.

Next, as shown in FIG. 25, a description is given of a case of performing bending for the workpiece W having comparatively small size in the x-axis direction as shown in FIG. 25 with reference to FIG. 30.

The operation shown in FIG. 30 is different from that shown in FIG. 29 in that an operation of step S309 is executed instead of the operation of the step S209 and an operation of step S332 is executed instead of the operation of the step S232.

In the step S309, the navigating member 206, backgauge BG, and footswitch 208 are moved and positioned. However, each bending angle detecting device 102 is not moved and positioned and is retracted in the x-axis direction to be prevented from interfering with the navigating member 206.

In step S323, each bending angle detecting device 102 is moved and positioned in the x-axis direction to measure the bending angle of the workpiece W.

With the conventional workpiece bending machine, in the case of performing predetermined bending for a workpiece to obtain a product, the entire operation is not automated although individual operations of the bending machine (for example, the operation of detecting (measuring) the workpiece bending angle) is automated. Accordingly, it is sometimes difficult to efficiently obtain the product by performing bending for the workpiece.

According to the workpiece bending machine 101, since the workpiece bending machine 101 is configured as described above, the operations of bending the workpiece to obtain the product (operations including calculation of the positions of the tools and workpiece, measurement of the bending angle, and the like) are integrally automated, and there is less need for intervention of the operator in terms of the entire operation of the workpiece bending machine in product production than before. Accordingly, the workpiece bending machine 101 can efficiently produce a product than the conventional workpiece bending machine can.

According to the workpiece bending machine 101, the navigating unit is provided, so that the workpiece W is easily positioned in a lateral direction of the workpiece bending machine 101 (in the direction that the bending line of the workpiece extends; in the x-axis direction) in bending of the workpiece W, producing a product more efficiently.

Moreover, according to the workpiece bending machine 101, the number and positions of the workpiece bending angle detecting devices 102 are determined on the basis of the product information, so that the bending angle of the workpiece W at bending of the workpiece W can be accurately measured according to the form of the workpiece W and the like. It is therefore possible to achieve more accurate bending.

Furthermore, according to the workpiece bending machine 101, the footswitch 208 freely moved and positioned is provided, so that the operator can easily operate the footswitch 208 for bending of the workpiece W. It is therefore possible to perform more efficient bending for the workpiece W.

Depending on the bending form of the workpiece W, the navigating member may be composed of the footswitch 208. Specifically, referring to the position of the footswitch 208 position, the operator recognizes tools for use in folding the workpiece W while finding the setting position of the workpiece W in the bending machine 101 in the x-axis direction.

According to the workpiece bending machine 101, the plurality of crowning units 231 are provided, and the workpiece W can be therefore bent into a more accurate shape. A number of crowning units 231 are aligned in the direction that the tools are arranged (the direction that the bending line of the workpiece W extends; the lateral direction of the workpiece bending machine 101), so that crowning can be implemented in various forms. For example, not only crowning just with the central part convex, but also crowning in the form of protrusions and recesses repeated in the x-axis direction can be implemented. Proper crowning according to each tool can be thus obtained.

The present invention is not limited to the description of the aforementioned embodiment of the invention in addition to the previously described embodiment and can be implemented in other various forms by making a proper modification.

The entire contents of Japanese Patent Applications No. 2004-377571 (filed on Dec. 27, 2004) and No. 2005-356558 (filed on Dec. 9, 2005) are incorporated herein by reference.

The invention claimed is:

1. A workpiece bending angle detecting device used in a bending machine which bends a workpiece in cooperation of upper and lower tools, the workpiece bending angle detecting device comprising:
    detector that detects a bending angle of the workpiece using at least one contact element of the detector that is moved to contact the workpiece as a casing of the detector disposed around the at least one contact element is fixed in contact with a contact portion of one of the upper and lower tools;
    a first moving unit which moves the detector between a position of the detector when the casing of the detector is fixed in contact with the contact portion and a position of the detector when the detector is separated from the tools; and
    a second moving unit which moves the detector in a direction of a bending line of the workpiece when the detector is separated from the tools by the first moving unit.

2. The workpiece bending angle detecting device according to claim 1, wherein the contact portion is formed in a side face of the lower tool;
    wherein the first moving unit diagonally moves the detector from a lower retracted position where the detector is separated from the lower tool to an upper contact position where the casing of the detector is fixed in contact with the contact portion; and
    wherein the first moving unit also linearly moves the detector on a side near the lower retracted position and moves the detector on a side near the upper contact position in a manner allowing a rate at which the detector horizontally approaches the contact portion to be higher than a rate at which the detector rises.

3. A workpiece bending machine, comprising:
    a bending sequence determination unit that determines a bending sequence of a workpiece on the basis of product information;
    a tool determination unit that determines tools used for bending of the workpiece on the basis of the product information;
    a tool layout determination unit that determines a layout of the tools used for bending of the workpiece on the basis of the product information;
    a workpiece position calculation unit that calculates, as workpiece position information, a position of the workpiece with respect to setting positions of the tools determined by the tool layout determination unit for each step of the bending sequence of the workpiece determined by the bending sequence determination unit;
    an angle detection position determination unit that determines a position where the bending angle of the workpiece is detected for each step of the bending sequence of the workpiece determined by the bending sequence determination unit; and
    a plurality of workpiece bending angle detecting devices which detect the bending angle of the workpiece and which are allowed to be independently moved and positioned, wherein the angle detecting position determination unit determines a number and positions of the workpiece bending angle detecting devices used on the basis of the product information, and wherein each of the workpiece bending angle detecting devices comprises a detector that detects a bending angle of the workpiece using at least one contact element of the detector that is moved to contact the workpiece as a casing of the detector disposed around the at least one contact element is fixed in contact with a contact portion of one of the upper and lower tools.

4. The workpiece bending machine according to claim 3, further comprising:

a navigating unit that guides the position of the workpiece in a direction in which the bending line of the workpiece extends for bending of the workpiece.

5. The workpiece bending machine according to claim 3, further comprising:

a footswitch to activate a ram of the workpiece bending machine, wherein the footswitch is moved and positioned on the basis of the position of the workpiece calculated by the workpiece position calculation unit.

6. The workpiece bending machine according to claim 3, wherein a plurality of crowning units are provided for at least one of an upper table on which an upper tool is set and a lower table on which a lower tool is set.

* * * * *